US012613595B2

(12) United States Patent
Zhao et al.

(10) Patent No.: US 12,613,595 B2
(45) Date of Patent: Apr. 28, 2026

(54) TOUCH SCANNING METHOD, TOUCH SCREEN, AND ELECTRONIC DEVICE

(71) Applicant: Honor Device Co., Ltd., Shenzhen (CN)

(72) Inventors: Guangxu Zhao, Shenzhen (CN); Jin Tao, Shenzhen (CN); Ruiqin Li, Shenzhen (CN); Yue Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/849,235

(22) PCT Filed: Apr. 20, 2023

(86) PCT No.: PCT/CN2023/089509
§ 371 (c)(1),
(2) Date: Sep. 20, 2024

(87) PCT Pub. No.: WO2024/027211
PCT Pub. Date: Feb. 8, 2024

(65) Prior Publication Data
US 2025/0216979 A1 Jul. 3, 2025

(30) Foreign Application Priority Data

Jul. 30, 2022 (CN) .......................... 202210915350.5

(51) Int. Cl.
*G06F 3/041* (2006.01)
*G06F 3/044* (2006.01)

(52) U.S. Cl.
CPC ...... *G06F 3/041661* (2019.05); *G06F 3/0446* (2019.05); *G06F 2203/04104* (2013.01)

(58) Field of Classification Search
CPC ............. G06F 3/041661; G06F 3/0446; G06F 2203/04104; G06F 3/04166
See application file for complete search history.

(56) References Cited

U.S. PATENT DOCUMENTS 9,785,217 B2 * 10/2017 Schwartz .............. G06F 1/3206
2010/0214232 A1 * 8/2010 Chan ................... G06F 3/04182
345/173

(Continued)

FOREIGN PATENT DOCUMENTS

CN 102004592 A 4/2011
CN 102495690 A 6/2012

(Continued)

OTHER PUBLICATIONS

Guo Hanya;"Research on the Scanning Sensitivity and Waterproof of Capacitive Touch Key";Electronic Technology;Dec. 25, 2012;3pages(with English abstract).

(Continued)

*Primary Examiner* — Ibrahim A Khan
(74) *Attorney, Agent, or Firm* — Slater Matsil, LLP

(57) ABSTRACT

This application provides a touch scanning method, a touch screen, and an electronic device. The method includes: displaying, by an electronic device, a first interface, and performing touch operation scanning on a touch screen in a first scanning manner; and performing, when switching to a second interface, touch operation scanning on the touch screen in a second scanning manner associated with a first area, where a key hot zone in the second interface is located in the first area, and the first area is a position of the key hot zone in the second interface corresponding to the touch screen; and the first scanning manner and the second scanning manner have different scanning directions.

20 Claims, 19 Drawing Sheets

(56) References Cited

U.S. PATENT DOCUMENTS

| | | | |
|---|---|---|---|
| 2013/0265276 A1* | 10/2013 | Obeidat | G06F 3/041662 |
| | | | 345/174 |
| 2013/0300674 A1 | 11/2013 | Davidson | |
| 2014/0340359 A1 | 11/2014 | Sundara-Rajan et al. | |
| 2015/0022485 A1 | 1/2015 | Chen et al. | |
| 2015/0022494 A1* | 1/2015 | Azumi | G06F 3/0445 |
| | | | 345/174 |
| 2015/0169101 A1* | 6/2015 | Jung | G06F 3/04166 |
| | | | 345/174 |
| 2016/0259467 A1* | 9/2016 | Nayyar | G06F 3/041661 |
| 2017/0090616 A1* | 3/2017 | Ahsan | G06F 3/0446 |
| 2018/0004345 A1* | 1/2018 | Shin | G06F 3/0412 |
| 2018/0011566 A1* | 1/2018 | Ahsan | G06F 3/0446 |
| 2018/0275825 A1* | 9/2018 | Drake | G06F 3/0443 |
| 2020/0167537 A1* | 5/2020 | Lee | G06F 3/044 |
| 2021/0278966 A1* | 9/2021 | Rosenberg | G06F 3/016 |
| 2023/0086442 A1* | 3/2023 | Van Ostrand | G06V 40/1306 |
| | | | 345/173 |
| 2023/0178001 A1 | 6/2023 | Sin et al. | |

FOREIGN PATENT DOCUMENTS

| | | | |
|---|---|---|---|
| CN | 103235664 | A | 8/2013 |
| CN | 104285195 | A | 1/2015 |
| CN | 105955553 | A | 9/2016 |
| CN | 106201064 | A | 12/2016 |
| CN | 106249968 | A | 12/2016 |
| CN | 108228013 | A | 6/2018 |
| CN | 109542272 | A | 3/2019 |
| CN | 110489015 | A | 11/2019 |
| CN | 111240529 | A | 6/2020 |
| CN | 113918047 | A | 1/2022 |
| WO | 2022030757 | A1 | 2/2022 |

OTHER PUBLICATIONS

GyeongSeop Choi et al;"Symmetric Signal Reconstruction and Frequency-Division Differential Driving for High Rate Touch Screen Sensing";Journal of Display Technology ( vol. 12, Issue: 11, Nov. 2016); 10pages.

* cited by examiner

Electronic device 500

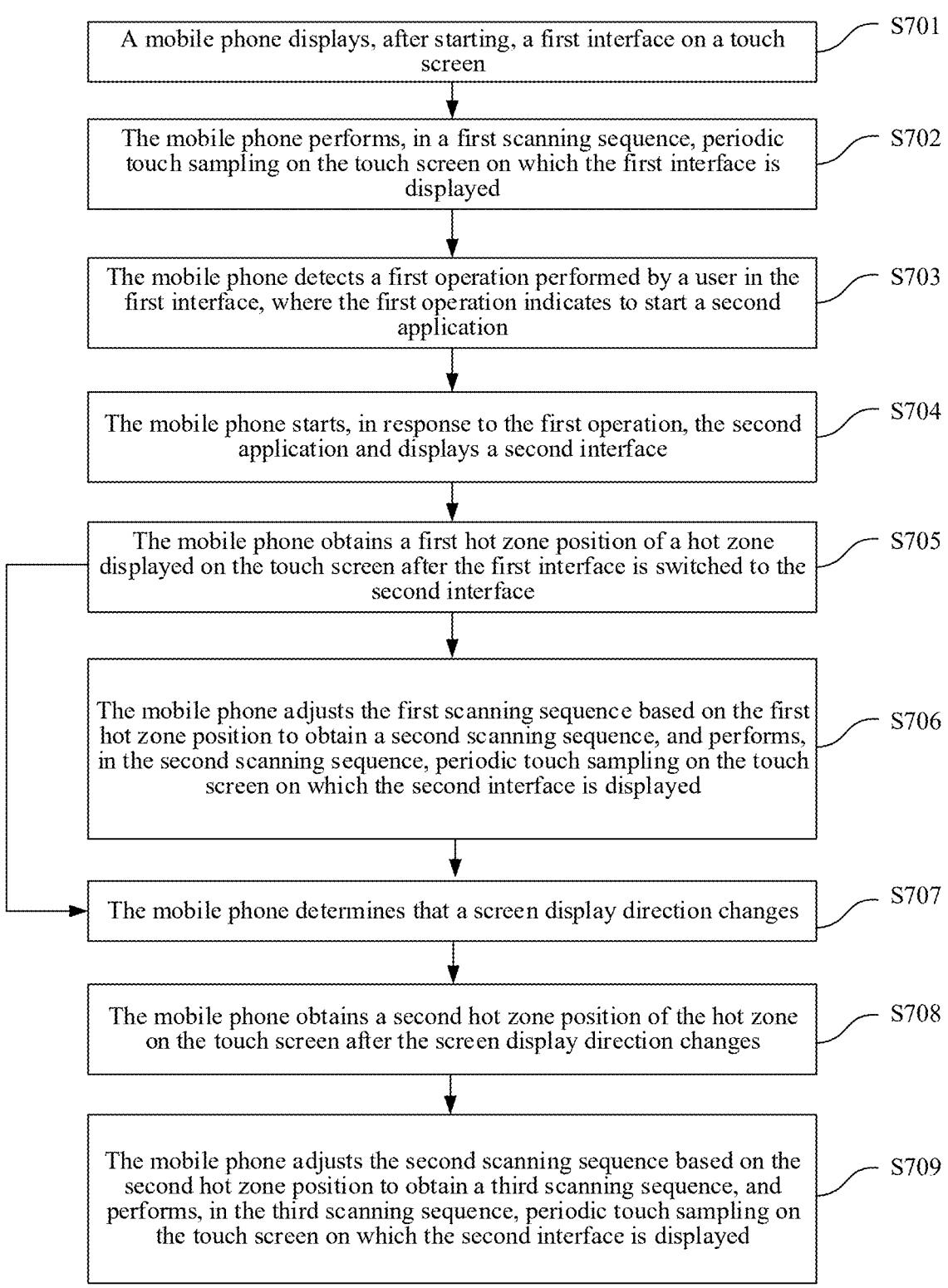

A mobile phone displays, after starting, a first interface on a touch screen — S701

The mobile phone performs, in a first scanning sequence, periodic touch sampling on the touch screen on which the first interface is displayed — S702

The mobile phone detects a first operation performed by a user in the first interface, where the first operation indicates to start a second application — S703

The mobile phone starts, in response to the first operation, the second application and displays a second interface — S704

The mobile phone obtains a first hot zone position of a hot zone displayed on the touch screen after the first interface is switched to the second interface — S705

The mobile phone adjusts the first scanning sequence based on the first hot zone position to obtain a second scanning sequence, and performs, in the second scanning sequence, periodic touch sampling on the touch screen on which the second interface is displayed — S706

The mobile phone determines that a screen display direction changes — S707

The mobile phone obtains a second hot zone position of the hot zone on the touch screen after the screen display direction changes — S708

The mobile phone adjusts the second scanning sequence based on the second hot zone position to obtain a third scanning sequence, and performs, in the third scanning sequence, periodic touch sampling on the touch screen on which the second interface is displayed — S709

FIG. 7

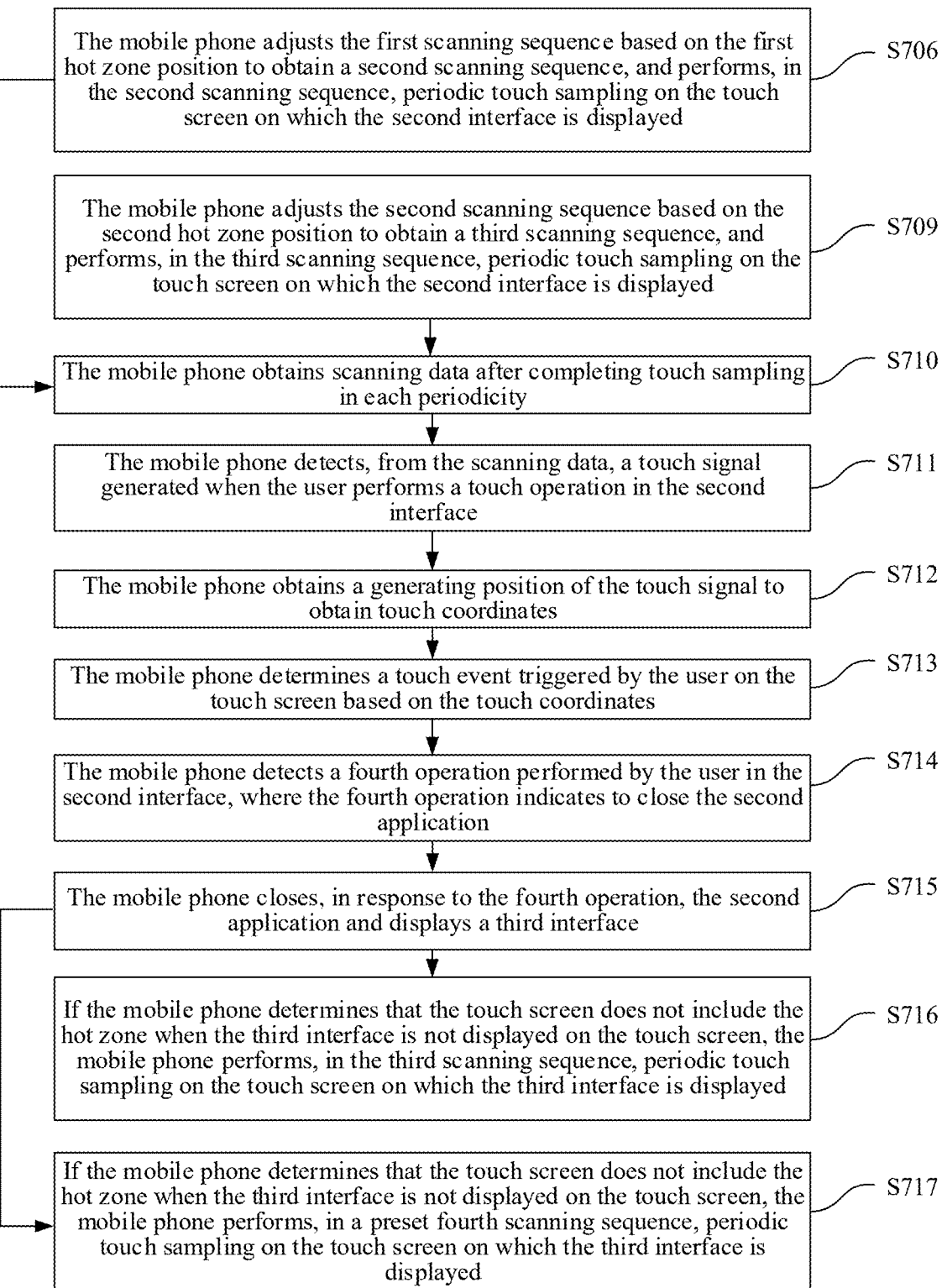

The mobile phone adjusts the first scanning sequence based on the first hot zone position to obtain a second scanning sequence, and performs, in the second scanning sequence, periodic touch sampling on the touch screen on which the second interface is displayed — S706

The mobile phone adjusts the second scanning sequence based on the second hot zone position to obtain a third scanning sequence, and performs, in the third scanning sequence, periodic touch sampling on the touch screen on which the second interface is displayed — S709

The mobile phone obtains scanning data after completing touch sampling in each periodicity — S710

The mobile phone detects, from the scanning data, a touch signal generated when the user performs a touch operation in the second interface — S711

The mobile phone obtains a generating position of the touch signal to obtain touch coordinates — S712

The mobile phone determines a touch event triggered by the user on the touch screen based on the touch coordinates — S713

The mobile phone detects a fourth operation performed by the user in the second interface, where the fourth operation indicates to close the second application — S714

The mobile phone closes, in response to the fourth operation, the second application and displays a third interface — S715

If the mobile phone determines that the touch screen does not include the hot zone when the third interface is not displayed on the touch screen, the mobile phone performs, in the third scanning sequence, periodic touch sampling on the touch screen on which the third interface is displayed — S716

If the mobile phone determines that the touch screen does not include the hot zone when the third interface is not displayed on the touch screen, the mobile phone performs, in a preset fourth scanning sequence, periodic touch sampling on the touch screen on which the third interface is displayed — S717

FIG. 8

First scanning sequence
(from top to bottom)

(a)                  (b)

(a)

(b)

Third
scanning
sequence (a)

(b)

TOUCH SCANNING METHOD, TOUCH SCREEN, AND ELECTRONIC DEVICE

CROSS-REFERENCE TO RELATED APPLICATIONS

This application is a national stage of International Application No. PCT/CN2023/089509, filed on Apr. 20, 2023, which claims priority to Chinese Patent Application No. 202210915350.5, filed on Jul. 30, 2022, both of which are incorporated herein by reference in their entireties.

TECHNICAL FIELD

This application relates to the field of communication technologies, and in particular, to a touch scanning method, a touch screen, and an electronic device.

BACKGROUND

With development of touch screens, touch gradually becomes a main input manner for human-computer interaction in electronic devices (such as mobile phones). As an important performance index of the touch, a touch response speed directly affects sensitivity of a touch operation performed by a user on a touch screen. The touch response speed depends largely on a hardware sampling speed. A faster hardware sampling speed indicates a faster touch response speed.

A conventional touch screen usually affects a hardware sampling periodicity by changing a hardware scanning frequency, to adjust the hardware sampling speed and the touch response speed. A faster hardware scanning frequency indicates a shorter hardware sampling periodicity. In this case, a greater quantity of completion times of hardware sampling indicates a greater quantity of reporting times of a hardware sampling result. In this way, the hardware sampling speed can be increased, thereby increasing the touch response speed.

However, changing the hardware scanning frequency requires improvement in hardware scanning, which increases hardware costs, and also limits improvement in the touch response speed.

SUMMARY

This application provides a touch scanning method, a touch screen, and an electronic device, which can adjust sampling duration of a hardware sampling stage in a touch detection process by adjusting a scanning direction of the touch screen, thereby adjusting a touch response speed. In this way, hardware costs do not need to be increased, and diversity of scanning manners is also increased.

To achieve the foregoing objective, the following technical solutions are used in embodiments of this application:

According to a first aspect, an embodiment of this application provides a touch scanning method, applied to an electronic device, where the electronic device includes a touch screen, and the method includes: displaying, by the electronic device, a first interface, and performing touch operation scanning on the touch screen in a first scanning manner; and performing, when switching to a second interface, touch operation scanning on the touch screen in a second scanning manner associated with a first area, where a key hot zone in the second interface is located in the first area, and the first area is a position of the key hot zone in the second interface corresponding to the touch screen; and the first scanning manner and the second scanning manner have different scanning directions.

In this application, a scanning manner of touch sampling by the electronic device is not fixed any more, but is correspondingly adjusted based on a position of the key hot zone on a screen. For example, the position of the key hot zone changes from a third area to a first area, the scanning manner changes from a first scanning manner to a second scanning manner, or an interface is switched from not including the key hot zone to including the key hot zone. If the scanning manner dynamically changes, the electronic device scans a channel in which a touch point formed by a touch operation is located until corresponding reporting time when scanning data of all channels is reported changes, and hardware sampling time also changes correspondingly, so that a touch response speed is adjusted when an original scanning frequency is maintained. In addition, diversity of scanning manners is further increased, to meet touch sensitivity requirements in different delay scenarios.

With reference to the first aspect, in a possible design manner, the method further includes: when the second interface is switched from portrait display to landscape display; or when the second interface is switched from the landscape display to the portrait display; or when the second interface is switched from display in a first landscape direction to display in a second landscape direction, where an angle between the first landscape direction and the second landscape direction is 180°, switching, by the electronic device, to a third scanning manner to perform touch operation scanning based on a second area in which the key hot zone is located.

In this design manner, a screen display direction changes, so that the hot zone position of the key hot zone on the touch screen also changes. For example, when a first screen display direction is the first landscape direction, the key hot zone is located at the bottom of the touch screen; and when the screen display direction changes into the second landscape direction, the key hot zone is located at the top of the touch screen. Therefore, the electronic device determines the hot zone position based on the screen display direction, thereby adjusting the scanning manner based on the hot zone position. In this way, beneficial effects of dynamically adjusting the scanning manner in different screen display directions can be achieved in this application.

With reference to the first aspect, in a possible design manner, the first area is close to a first boundary position of the touch screen, and the performing touch operation scanning on the touch screen in a second scanning manner associated with a first area includes: performing a touch scanning operation in a direction of a drive electrode at the first boundary position starting from a drive electrode at a second boundary position away from the first boundary position on the touch screen, where the first boundary position and the second boundary position are located on opposite sides of the touch screen.

In this design manner, the first scanning manner can make a channel in which the first area is located be scanned later. In this case, compared with another scanning manner, if a distance between the first area and a farthest drive electrode is the farthest when the first scanning manner is used, a delay from sampling to reporting in the key hot zone is small, so that touch response time of a touch operation performed by a user in the key hot zone is shorter, and touch sensitivity is higher. When the first area changes, the scanning manner is correspondingly adjusted based on the first area, so that the key hot zone on the touch screen can always be scanned later. In this way, the electronic device can improve touch response time when the user uses different applications or in different screen display directions, thereby improving touch experience of the user.

With reference to the first aspect, in a possible design manner, the first area is close to a first boundary position of the touch screen, and the performing touch operation scanning on the touch screen in a second scanning manner associated with a first area includes: performing touch scanning operation in a direction of a drive electrode at a second boundary position away from the first boundary position starting from a drive electrode at the first boundary position on the touch screen, where the first boundary position and the second boundary position are located on the opposite sides of the touch screen.

In this design manner, the first scanning manner makes a channel in which the first area is located be scanned earlier. In this case, compared with the another scanning manner, if a distance between the first area and a nearest drive electrode is the closest when the first scanning manner is used, a delay from sampling to reporting in the key hot zone is large, so that touch response time of a touch operation performed by a user in the key hot zone is longer, and touch sensitivity is lower. When the first area changes, the scanning manner is correspondingly adjusted based on the first area, so that the first area can always be scanned earlier. This design manner is applicable to a high-delay scenario (for example, applicable to an application that needs to increase a touch stickiness sensation).

Optionally, the first scanning manner is determined based on the first area and an application identifier, for example, an application identifier of the application that needs to increase the touch stickiness sensation, which can correspond to the first scanning manner that makes the first area be scanned earlier. If the electronic device detects that a run application includes the application identifier, the scanning manner is adjusted so that the first area can be scanned earlier all the time.

With reference to the first aspect, in a possible design manner, the method further includes: obtaining, by the electronic device, a frequency of a touch event detected in each area on the touch screen in a preset time period, where the second interface is displayed on the touch screen in the preset time period; and using an area in which the frequency meets a preset condition as the key hot zone.

In this design manner, the preset condition includes: The frequency is greater than or equal to a preset value. To be specific, when a frequency of a touch event triggered in the key hot zone in the preset time period is greater than or equal to the preset value, it indicates that the key hot zone is a high-frequency trigger area. In this way, the touch event in the key hot zone has a large proportion in all touch events in the entire second interface. In this case, the scanning manner is adjusted based on the position of the key hot zone to adjust hardware sampling time consumption of a channel in which the key hot zone is located, so that hardware sampling time consumption consumed by all the touch events in the second interface can be significantly affected. If the hardware sampling time consumption is reduced, a touch response speed of the touch screen is correspondingly accelerated.

With reference to the first aspect, in a possible design manner, the method further includes: obtaining a touch type corresponding to a touch object in the key hot zone, where the touch type is for determining a response speed priority of the touch object; and using an area of the touch object on the touch screen as the key hot zone if it is determined that the response speed priority is a target priority based on the touch type.

In this design manner, response speed priorities include a high priority, a medium priority, a low priority, and the like, and the target priority may be any one of the response speed priorities. For example, the target priority is the high priority. When the touch object has a high priority requirement for the response speed, it indicates that the key hot zone is an area with a high response delay requirement compared with other areas on the touch screen. In this case, the scanning manner is adjusted based on the key hot zone with the high response delay requirement, the hardware sampling time consumption of the channel in which the key hot zone is located can be significantly increased or reduced.

The key hot zone may be both the high-frequency trigger area and the area with the high response delay requirement. The key hot zone may be only the high-frequency trigger area, or only the area with the high response delay requirement.

With reference to the first aspect, in a possible design manner, the method further includes: starting, by the electronic device, a target application, where the second interface is an interface of the target application; obtaining, by the electronic device, an application identifier of the target application; obtaining an initial area of the key hot zone corresponding to the target application on the touch screen based on the application identifier; and using, by the electronic device, the initial area as the first area if it is determined that a screen display direction does not change.

In this design manner, the electronic device is preset with a mapping relationship between the application identifier and the initial area. If the electronic device detects that the user opens the target application, based on the application identifier of the target application, a position of the key hot zone in the second interface on the touch screen displayed after the target application is opened may be directly obtained. In this way, the scanning manner can be adjusted when the user opens the target application in this design manner, so that the key hot zone in the second interface displayed through the target application can be scanned earlier or later.

With reference to the first aspect, in a possible design manner, the obtaining an initial area of the key hot zone corresponding to the target application on the touch screen based on the application identifier includes: enabling a function of dynamically adjusting the scanning manner if it is determined that the target application is a preset application; and obtaining the initial area of the key hot zone corresponding to the target application on the touch screen based on the application identifier of the target application.

In this design manner, the electronic device may enable the function of dynamically adjusting the scanning manner only when the user opens the preset application. If the user opens a non-preset application, the scanning manner may be dynamically adjusted without using the method in this application, to reduce calculation costs.

The preset application includes a game application. Alternatively, the preset application includes an application with a high response delay other than the game application, for example, an input method application, a chat application, or a live streaming application.

With reference to the first aspect, in a possible design manner, the method further includes: obtaining a rotation direction and a rotation angle of the electronic device; and determining, if the rotation angle is greater than or equal to a deflection threshold, that the screen display direction changes when the touch screen is switched to the second interface.

In this design manner, the electronic device can detect that the screen display direction changes as long as the electronic device detects that the mobile phone rotates. Because the electronic device may continuously detect the rotation direction and the rotation angle, a speed of adaptively adjusting the scanning manner by the electronic device is faster, and a speed of adjusting the touch response speed is also faster.

With reference to the first aspect, in a possible design manner, the method further includes: switching, by the electronic device if a gesture operation performed in the second interface is detected, to the third scanning manner to perform touch operation scanning based on the second area in which the key hot zone in the second interface is located, where the gesture operation is for adjusting a display direction of the second interface when the touch screen is not rotated.

In this design manner, the electronic device may determine that the screen display direction changes based on the gesture operation, to determine that the position of the key hot zone on the touch screen changes. In this way, the electronic device can dynamically adjust the scanning manner.

With reference to the first aspect, in a possible design manner, the method further includes: performing touch operation scanning in a preset scanning direction when the first interface does not include the key hot zone.

In this design manner, the electronic device is preset with the scanning manner, so that when the first interface of the electronic device does not include the key hot zone, scanning can be performed in a default preset scanning manner.

With reference to the first aspect, in a possible design manner, after the performing touch operation scanning on the touch screen in a second scanning manner associated with a first area, the method further includes: displaying a third interface, and scanning, when the third interface does not include the key hot zone, a touch operation on the touch screen in the second scanning manner or the preset scanning direction.

In this design manner, the electronic device displays the third interface, and when the third interface does not include the key hot zone, the electronic device may continue to perform periodical sampling on the touch screen in an original scanning manner (the second scanning manner), or may perform scanning based on the preset scanning manner. In this way, diversity of the scanning manners of the electronic device is increased.

With reference to the first aspect, in a possible design manner, the first scanning manner or the second scanning manner is in a periodic cycle, and the method further includes: detecting, from the scanning data, a touch signal generated when the touch screen receives the touch operation; obtaining a generation position of the touch signal, to obtain touch coordinates corresponding to the touch operation; determining a touch object corresponding to the touch operation based on the touch coordinates; and responding the touch operation based on the touch object.

In this design manner, the electronic device determines, from the scanning data, a channel in which distribution of capacitance signals is different from those of a front channel and a rear channel, to detect a capacitance signal generated at the touch point. The electronic device can obtain touch coordinates of a touch operation based on the capacitance signal, and determines which event corresponding to a touch event that the touch responds to on the touch operation, to respond to the touch event corresponding to the touch operation, and perform a corresponding visual output on the touch screen. For example, data of the channel in which the key hot zone is located in the scanning data is reported later, and correspondingly, waiting time for reporting in the key hot zone is shorter. In this way, total time for the electronic device to respond to the touch operation in the key hot zone is shorter. For the user, if the response speed is fast, and the touch sensitivity is high, interaction experience is better.

According to a second aspect, this application provides a touch screen, for performing the method according to the first aspect and possible design manners of the first aspect.

According to a third aspect, this application provides an electronic device, including a touch screen, a memory, and one or more processors, where the touch screen, the memory, and the processor are coupled; the memory is configured to store computer program code, and the computer program code includes computer instructions; and when the processor executes the computer instructions, the electronic device is enabled to perform the method according to the first aspect and possible designs of the first aspect.

According to a fourth aspect, this application provides a computer-readable storage medium, including computer instructions, where the computer instructions, when run on an electronic device, enable the electronic device to perform the method according to the first aspect and possible designs of the first aspect.

According to a fifth aspect, this application provides a computer program product, where the computer program product, when run on a computer, enables the computer to perform the method according to the first aspect and possible designs of the first aspect.

It may be understood that, the touch screen according to the second aspect, the electronic device according to the third aspect, the computer storage medium according to the fourth aspect, and the computer program product according to the fifth aspect that are provided above are all configured to perform the corresponding method provided above. Therefore, for beneficial effects that can be achieved therein, refer to beneficial effects in the corresponding method provided above, and this is not described herein again.

BRIEF DESCRIPTION OF THE DRAWINGS

FIG. 7 is a first flowchart of a touch scanning method according to an embodiment of this application;

FIG. 8 is a second flowchart of a touch scanning method according to an embodiment of this application;

DETAILED DESCRIPTION OF ILLUSTRATIVE EMBODIMENTS

The terms "first" and "second" mentioned below are used merely for the purpose of description, and shall not be construed as indicating or implying relative importance or implying a quantity of indicated technical features. Therefore, features defining "first" and "second" may explicitly or implicitly include one or more of the features. In descriptions of embodiments of this application, unless otherwise stated, "a plurality of" means two or more.

A touch screen of an electronic device is usually provided with a lateral electrode and a longitudinal electrode, for example, which may be referred to as a sense electrode (receive channel, RX channel) and a drive electrode (Transmit channel, TX channel) respectively, to perform touch detection.

Touch detection usually includes self-capacitance detection and mutual capacitance detection. Specifically, when performing self-capacitance detection, the electronic device may scan changes in self-capacitance of each TX channel and RX channel to ground. When a finger (or a stylus, the same below) approaches or touches the touch screen, self-capacitance of a channel near the finger becomes large. During mutual capacitance detection, capacitance is formed at an intersection of a TX channel and an RX channel, a positive electrode and a negative electrode of the capacitance are formed by the TX channel and the RX channel. The electronic device may scan a change in the capacitance formed at the intersection of the TX channel and the RX channel. When the finger approaches or touches the touch screen, mutual capacitance at an intersection of channels near the finger becomes large.

Figure 1:
FIG. 1 is a schematic diagram of a principle of signal sampling according to an embodiment of this application.

The electronic device generally needs to go through three stages to complete touch detection once, namely, hardware sampling, algorithm processing/data transmission, and coordinate reporting. In the hardware sampling stage, as shown in FIG. 1, the electronic device sequentially scans each TX channel in a preset scanning sequence (for example, a TX scanning sequence shown in FIG. 1). After each TX channel is scanned, scanning data of the TX channel is sent to the RX channel. After a scanning periodicity ends, all RX channels receive scanning data generated by all TX channels. In the algorithm processing/data transmission stage, the electronic device determines, from the scanning data, whether capacitance of a channel (or an intersection, the same bottom) in which a touch point is located and capacitance of a front channel and a rear channel change, to determine a lateral coordinate (determined through a position of a TX channel) and a longitudinal coordinate (determined through a position of an RX channel) of the touch point, and then form touch coordinates of the touch point. In the coordinate reporting stage, the electronic device reports the touch coordinates to another module for corresponding display.

For the foregoing three stages, improving a speed of the electronic device at any stage of touch detection can increase a touch response speed. Currently, the touch response speed is mostly increased in a manner of improving a hardware scanning frequency in the hardware sampling stage. However, improving hardware first brings about an increase in costs. Second, a scanning manner with a high reporting rate means a high working frequency, and then charging and discharging speeds of an electrode need to be increased correspondingly. This increases overall power consumption of the touch screen, reduces standby duration, and also easily causes the device to overheat, resulting in an increase in time for processing reported data by a processor, and in turn affecting the touch response speed.

Based on this, in embodiments of this application, time consumption in the hardware sampling stage can be reduced without improving the hardware, thereby increasing the touch response speed.

Before describing a method in embodiments of this application, an improvement principle of the method is first described.

It can be learned from the foregoing descriptions that, an electronic device determines, from scanning data, a channel of which capacitance changes with capacitance of a front channel and a rear channel. To include situations of capacitance of all channels in the scanning data, the electronic device usually uses time when all the channels are scanned once as one sampling periodicity, and reports scanning data obtained after each sampling periodicity ends. In other words, although there is a sequence for the channels to be scanned, time for reporting the scanning data of the channels is consistent. In this case, a channel scanned first has longer waiting time for reporting, and a channel scanned later has shorter waiting time for reporting.

Figure 2:
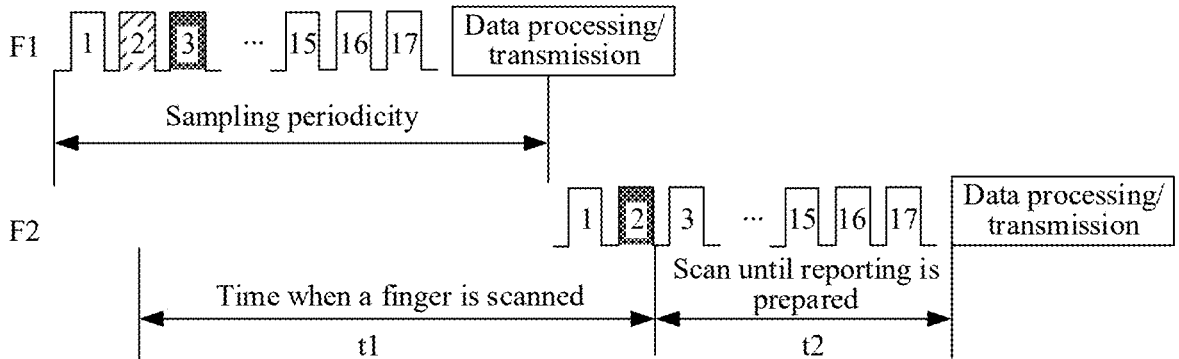
FIG. 2 is a schematic diagram of hardware sampling time consumption according to an embodiment of this application.

In this way, time consumption $t$ of one periodicity in the hardware sampling stage may be divided into two parts, as shown in FIG. 2:

A first part is scanning time $t1$, to be specific, scanning time from that a finger touches a touch screen to form a touch point to that hardware scans a channel in which the touch point of the finger is located. A value of $t1$ is determined by a quantity of to-be-scanned channels between the channel touched by the finger and a currently scanned channel. For example, when the channel touched by the finger is exactly the currently scanned channel, the quantity of to-be-scanned channels is 0, and in this case, $t1$ is equal to 0; and when the channel touched by the finger is exactly a previously scanned channel, a quantity of to-be-scanned channels before the channel is a quantity of all channels, and in this case, t1 is one sampling periodicity t. Therefore, t1∈[0, t]. Because channel scanning of the electronic device is periodically cyclic, it may be considered that a possibility that t1 is any value in the foregoing interval [0, t] is the same. Therefore, average duration of t1 is that (t+0)/2=sampling periodicity/2. The sampling periodicity t indicates time for scanning all the channels, and when a scanning frequency does not change, the sampling periodicity t remains unchanged.

A second part is waiting time t2 for reporting, to be specific, waiting time from that the hardware scans the channel in which the touch point is located to that scanning data is reported. It may be understood that, a channel scanned earlier indicates longer waiting time, so that t2 is longer; and conversely, a channel scanned later indicates shorter waiting time, so that t2 is shorter.

Therefore, it may be concluded that, a TX channel of a display touched by the finger scanner earlier indicates shorter sampling duration t' (t'=t1+t2), so that a response delay of the screen to a touch operation is shorter, and a response speed of the screen to the touch operation is faster, where t' indicates total duration for scanning the TX channel and reporting, and the sampling duration t' is different in a sequence in which the TX channel is scanned.

However, the existing hardware sampling methods all use a fixed scanning sequence, for example, the scanning sequence is fixed as one of from left to right, from right to left, from top to bottom, from bottom to top, from two sides to the middle, or from middle to the two sides. This leads to a fact that, although interaction positions of touch keys are different in different touch scenarios, the scanning sequence cannot be adaptively adjusted based on the interaction positions of the touch keys. In this case, a requirement that a channel in which a position (that is, a hot zone, also referred to as a key hot zone) frequently touched by a finger of a user is located is to be scanned later cannot be met during hardware sampling, and then the waiting time t2 for reporting increases, causing hardware sampling duration t' to increase. As a result, the response speed of the screen to the touch operation becomes slow, which affects device use experience of the user.

It should be noted that, touch detection sampling includes single-channel sampling and multi-channel composite sampling. For the single-channel sampling, one channel is scanned during each scanning, and all channels are scanned in sequence; and for the multi-channel composite sampling, a plurality of consecutive channels are used as one group of channels, one group of channels are scanned during each scanning, and all groups of channels are scanned in sequence. The method in embodiments of this application is applicable to a touch scanning solution implemented through a hardware sampling manner, such as the single-channel sampling or the multi-channel composite sampling.

Figure 3:
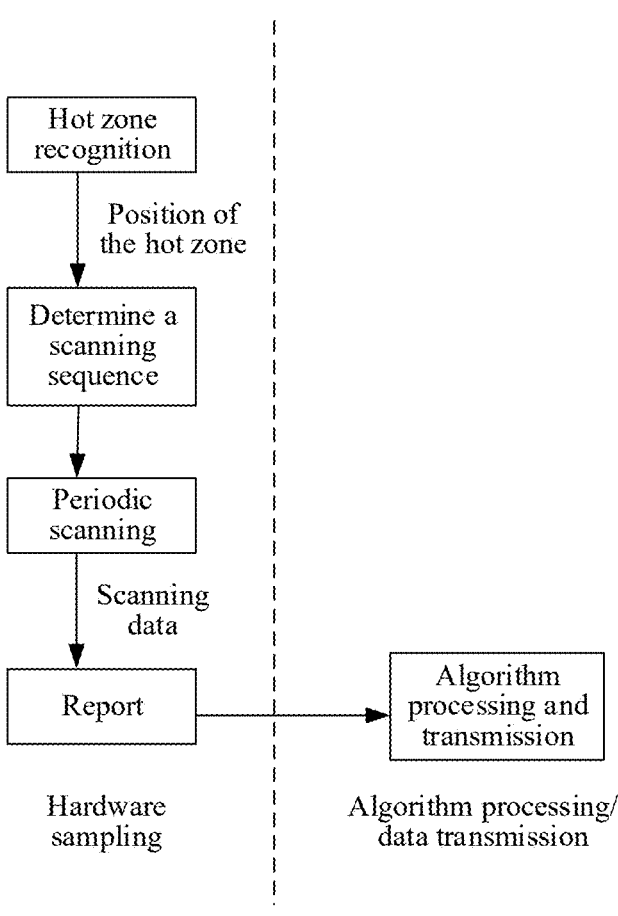
FIG. 3 is a flowchart of touch sampling according to an embodiment of this application.

To resolve the problem, in a touch scanning method provided in embodiments of this application, as shown in FIG. 3, an electronic device may obtain a position of a screen hot zone (that is, hot zone recognition) in a first interface displayed through a touch screen of the electronic device, and determine a scanning sequence of the touch screen based on the position of the screen hot zone. The electronic device performs periodic scanning on the touch screen in the scanning sequence. The electronic device determines that the scanning on the touch screen is completed, and obtains scanning data in a scanning periodicity. The electronic device reports the scanning data to another module for algorithm processing and transmission.

Figure 4:
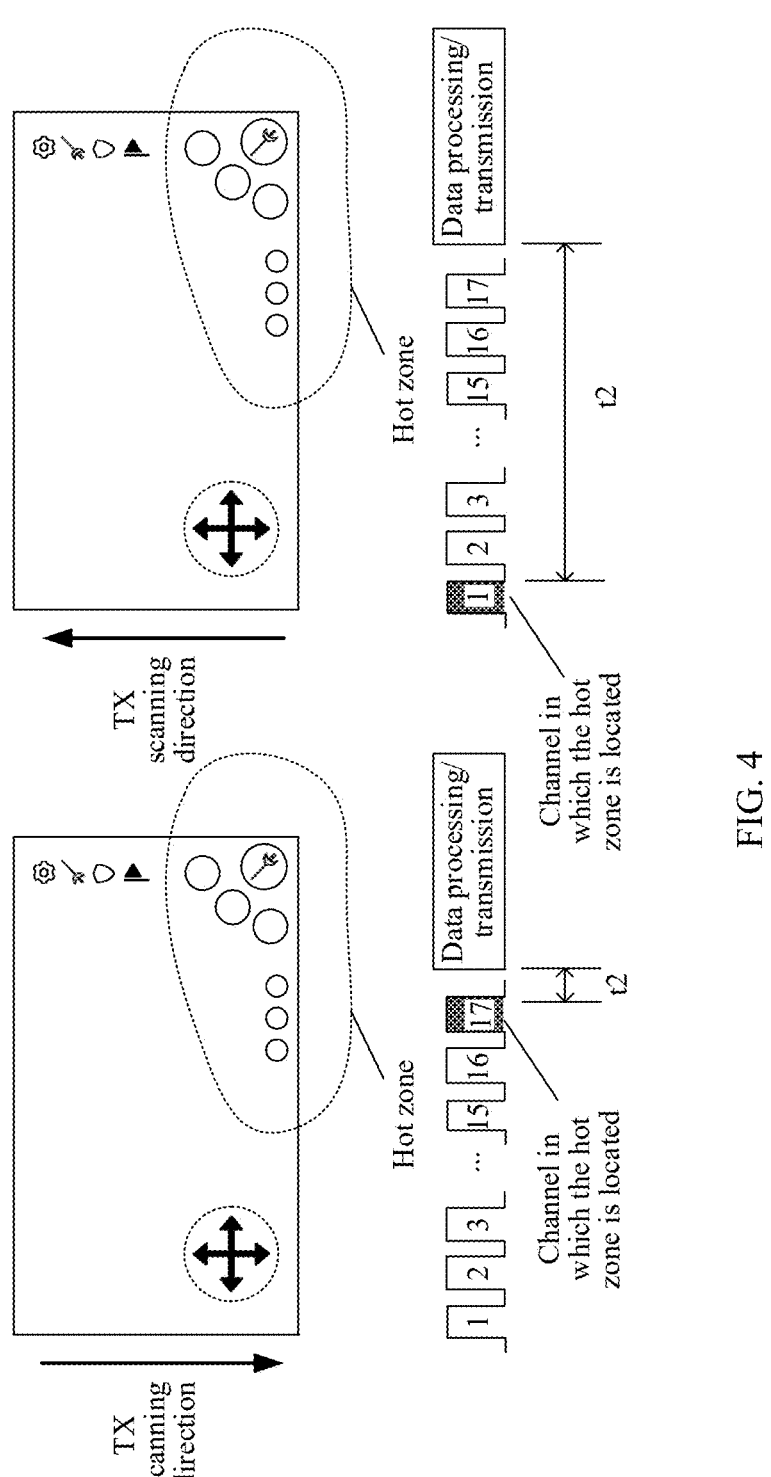
FIG. 4 is a schematic diagram of a principle of a scanning manner in a hardware sampling stage according to an embodiment of this application.

In this embodiment of this application, the scanning sequence of touch sampling by the electronic device is not fixed any more, but is correspondingly adjusted based on the position of the screen hot zone. As shown in FIG. 4, if the scanning sequence (corresponding to a TX scanning direction in the figure) dynamically changes, waiting time t2 for reporting from that the electronic device scans a channel in which a touch point is located to that the scanning data is reported also changes, and then hardware sampling time t' affecting a touch response speed also changes correspondingly. Therefore, the touch response speed can be adjusted when an original scanning frequency is maintained, and diversity of scanning manners is increased.

It should be noted that, in FIG. 4, the scanning sequence is the TX scanning direction, which means that the electronic device scans row by row from top to bottom or from bottom to top. If the scanning sequence is from left to right, the electronic device scans column by column from left to right. If the scanning sequence is from right to left, the electronic device scans column by column from right to left.

The touch scanning method provided in embodiments of this application is applicable to an electronic device with a touch screen such as a mobile phone, an in-vehicle device (also referred to as a vehicle machine), a tablet computer, a notebook computer, an ultra-mobile personal computer (ultra-mobile personal computer, UMPC), a handheld computer, a netbook, a personal digital assistant (personal digital assistant, PDA), a wearable electronic device, or a virtual reality device.

Figure 5:
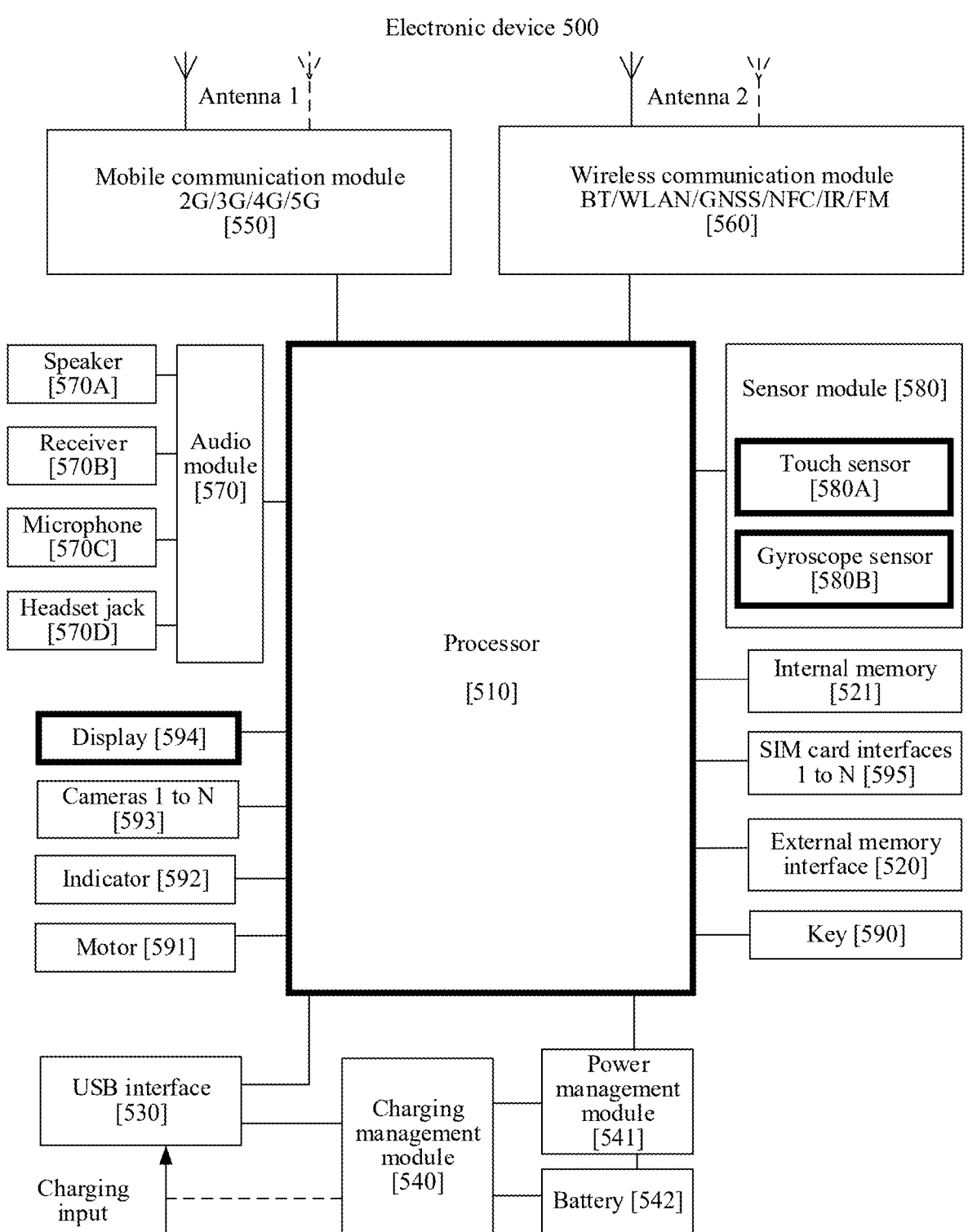
FIG. 5 is a schematic diagram of a hardware structure of an electronic device according to an embodiment of this application.

FIG. 5 is a schematic diagram of a structure of an electronic device 500 according to an embodiment of this application. The electronic device 500 may include a processor 510, an external memory interface 520, an internal memory 521, a universal serial bus (universal serial bus, USB) interface 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a key 590, a motor 591, an indicator 592, a camera 593, a display 594, a subscriber identification module (subscriber identification module, SIM) card interface 595, and the like.

The sensor module 580 may include a pressure sensor, a gyroscope sensor 580B, a barometric pressure sensor, a magnetic sensor, an acceleration sensor, a distance sensor, an optical proximity sensor, a fingerprint sensor, a temperature sensor, a touch sensor 580A, an ambient light sensor, a bone conduction sensor, or the like.

It can be understood that, a structure illustrated in this embodiment of this application does not constitute a specific limitation on the electronic device 500. In some other embodiments of this application, the electronic device 500 may include more or fewer components than those shown in the figure, or some components may be combined, or some components may be split, or a different component arrangement may be used. The illustrated components may be implemented by hardware, software, or a combination of software and hardware.

The processor 510 may include one or more processing units. For example, the processor 510 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), a micro controller unit (micro controller unit, MCU), and/or the like. Different processing units may be independent devices, or may be integrated into one or more processors.

The controller may be a neural center and a command center of the electronic device 500. The controller may generate an operation control signal based on instruction operation code and a time sequence signal, to complete control of instruction fetching and instruction executing.

A memory may further be arranged in the processor 510, to store instructions and data. In some embodiments, the memory in the processor 510 is a cache. The memory may store instructions or data just used or used cyclically used by the processor 510. If the processor 510 needs to use the instructions or data again, the instructions or data may be directly invoked from the memory. This avoids repeated access, and reduces waiting time of the processor 510, thereby improving system efficiency.

In some embodiments, the processor 510 may include one or more interfaces. The interface may include an inter-integrated circuit (inter-integrated circuit, I2C) interface, a serial peripheral interface (serial peripheral interface, SPI), an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that, an interface connection relationship between the modules shown in this embodiment of this application is merely an example for description, and constitutes no limitation on the structure of the electronic device 500. In some other embodiments of this application, the electronic device 500 may also use an interface connection manner different from that in the foregoing embodiment or a combination of a plurality of interface connection manners.

The charging management module 540 is configured to receive charge input from a charger. The power management module 541 is configured to connect to the battery 542, the charging management module 540, and the processor 510. The power management module 541 receives an input of the battery 542 and/or the charging management module 540, to supply power to the processor 510, the internal memory 521, an external memory, the display 594, the camera 593, the wireless communication module 560, and the like. In some other embodiments, the power management module 541 and the charging management module 540 may alternatively be arranged in a same device.

A wireless communication function of the electronic device 500 may be implemented by using the antenna 1, the antenna 2, the mobile communication module 550, the wireless communication module 560, the modem processor, the baseband processor, and the like. The antenna 1 and the antenna 2 are configured to transmit and receive electromagnetic wave signals. Each antenna of the electronic device 500 may be configured to cover one or more communication frequency bands. Different antennas may be multiplexed to increase antenna utilization. For example, the antenna 1 may be multiplexed as a diversity antenna of a wireless local area network. In some other embodiments, the antenna may be used with a tuning switch.

The mobile communication module 550 may provide a solution for wireless communication including 2G/3G/4G/5G and the like to be applied to the electronic device 500. The wireless communication module 560 may provide a solution applied to the electronic device 500 for wireless communication, for example, a wireless local area network (wireless local area networks, WLAN) (for example, a Wi-Fi network), Bluetooth (bluetooth, BT), a global navigation satellite system (global navigation satellite system, GNSS), frequency modulation (frequency modulation, FM), NFC, and an infrared (infrared, IR) technology.

The electronic device 500 implements a display function by using the GPU, the display 594, the application processor, and the like. The GPU is an image processing microprocessor, which is connected to the display 594 and the application processor. The GPU is configured to perform mathematical and geometric calculation for graphics rendering. The processor 510 may include one or more GPUs, and the GPU executes program instructions to generate or change display information.

The display 594 is configured to display an image and a video. The electronic device 500 may include one or N displays 594, where N is a positive integer greater than one.

The electronic device 500 can implement a shooting function by using the ISP, the camera 593, the video codec, the GPU, the display 594, the application processor, and the like. The ISP is configured to handle data returned by the camera 593. The camera 593 is configured to capture a still image (also referred to as a raw image) or a video. In this embodiment of this application, the ISP is further configured to process a raw image collected by the camera as a first image and a second image, and allocate the first image and the second image to different processors to respectively perform image stabilization processing and subject tracking processing. In some embodiments, the electronic device 500 may include one or N cameras 593, where N is a positive integer greater than one.

The NPU is a neural-network (neural-network, NN) computing processor, quickly processes input information by referring to a structure of a biological neural network, for example, by referring to a mode of transfer between neurons in human brain, and may further perform self-learning continuously. The NPU may implement an application like intelligent cognition of the electronic device 500, for example, image recognition, facial recognition, voice recognition, and text understanding.

The external memory interface 520 may be configured to connect to an external memory card, such as a Micro SD card, to extend a storage capability of the electronic device 500. The external memory card communicates with the processor 510 by using the external memory interface 520, to implement a data storage function, for example, store files such as music and a video into the external memory card.

The internal memory 521 may be configured to store computer-executable program code, where the executable program code includes instructions. The processor 510 runs the instructions stored in the internal memory 521, to perform various function applications and data processing of the electronic device 500. The internal memory 521 may include a program storage area and a data storage area. The program storage area may store an operating system, an application required by at least one function (such as a sound playback function and an image playback function), and the like. The data storage area may store data (such as audio data and an address book) created during use of the electronic device 500. In addition, the internal memory 521 may include a high-speed random access memory, and may also include a non-volatile memory, such as at least one magnetic disk storage device, a flash memory device, or a universal flash storage (universal flash storage, UFS).

The electronic device 500 can implement an audio function by using the audio module 570, the speaker 570A, the receiver 570B, the microphone 570C, the headset jack 570D, the application processor, and the like, for example, implement music playing, audio recording, and voice interaction.

The touch sensor 580A is also referred to as a "touch panel (TP)". The touch sensor 580A is configured to detect a touch operation performed on or near the touch sensor 580A. For example, a user performs an operation on a touch screen or near the touch screen by using any suitable object or accessory such as a finger or a stylus (for example, the user touches a function key on the touch screen). The touch sensor may transmit a detected touch operation to the application processor to determine a type of a touch event. In addition, the electronic device 500 may provide a visual output related to the touch operation by using the display 594. In this embodiment of this application, the touch sensor 580A and the display are combined into the touch screen. In some other embodiments, the touch sensor 580A may alternatively be arranged on a surface of the electronic device 500, at a position different from that of the display 594.

The gyroscope sensor 580B, also referred to as a gyroscope or an angular velocity sensor, may measure rotation and deflection actions of a mobile phone. In this embodiment of this application, the gyroscope sensor 580B is configured to detect whether the electronic device 500 rotates in a gravity direction and a rotation angle in the gravity direction. The rotation angle may be used by the processor 510 to determine a screen display direction, to obtain a hot zone position of a hot zone on the touch screen in the gravity direction. The hot zone position is for determining a scanning sequence that a touch panel (touch panel, TP) chip periodically scans channels on the touch screen of the electronic device 500.

The key 590 includes a start key, a volume key, and the like. The motor 591 can generate a vibration prompt. The indicator 592 may be an indicator light, to indicate a charging state and a power change, or to indicate a message, a missed call, a notification, or the like. The SIM card interface 595 is configured to be connected to a SIM card.

Figure 6:
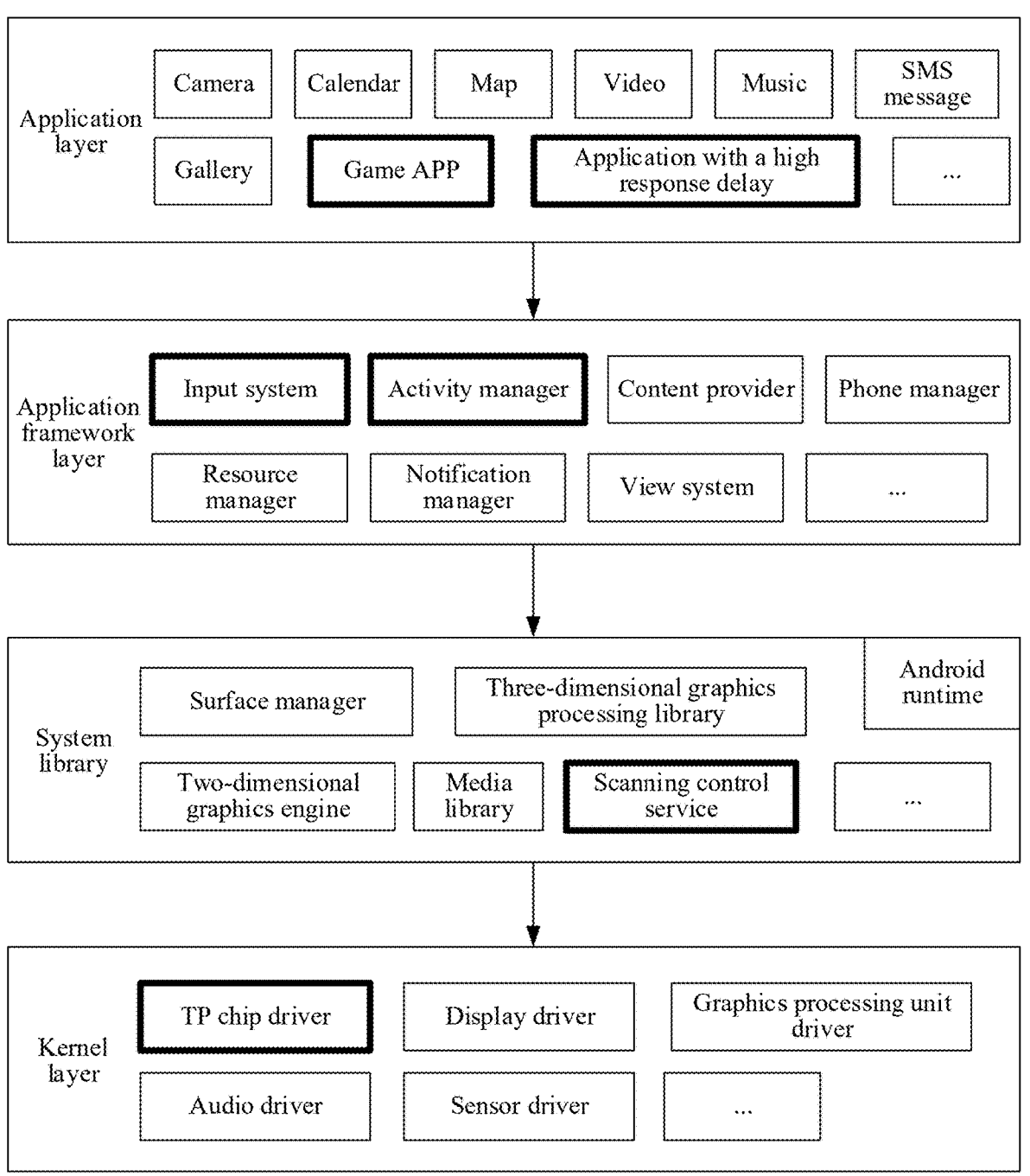
FIG. 6 is a schematic diagram of a software structure of an electronic device according to an embodiment of this application.

For example, the electronic device 500 is a mobile phone. FIG. 6 is a block diagram of a software structure of a mobile phone according to an embodiment of this application.

In a layered architecture, software is divided into a plurality of layers, and each layer has a clear role and task. The layers communicate with each other through a software interface. In some embodiments, an Android™ system is divided into four layers, which are respectively an application layer, an application framework layer, Android runtime (Android™ Runtime) and a system library, and a kernel layer from top to bottom.

As shown in FIG. 6, the application layer may include a series of application packages. An application package may include applications (application, APP) such as a camera, a calendar, a map, a video, music, an SMS message, and a gallery.

In this embodiment of this application, the application layer may also include a game APP or another second application with a high response delay requirement. Different application packages may correspond to different hot zones and hot zone positions. The mobile phone may distinguish the different application packages through application identifiers to obtain the hot zone positions. The application identifier may be a package name of the application.

In some embodiments, the mobile phone displays an application desktop, detects a first operation by a user on the application desktop, opens an application package that the first operation indicates to start, and obtains a package name of the application package and a rotation angle of the mobile phone in a gravity direction. Then, the mobile phone determines a rotation angle of a hot zone in the gravity direction based on the package name and the rotation angle.

The application framework layer provides an application programming interface (application programming interface, API) and a programming framework for an application of the application layer. The application framework layer includes some predefined functions.

As shown in FIG. 6, the application framework layer may include an input system, an activity manager, a window manager, a content provider, a view system, a phone manager, a resource manager, a notification manager, and the like.

The input system is configured to listen to an input module (for example, a TP chip driver) of the mobile phone, convert a parameter input by the input module into an available event, and transmit the event to a related module at an upper layer. For example, the input system is configured to listen to a touch screen of the mobile phone by using the TP chip driver, convert a touch parameter generated through a touch operation input from the touch screen into an available event, and transfer the event to an APP at the upper layer.

The activity manager is configured to manage a lifecycle of each application. The application usually runs in an operating system in a form of an activity. The activity manager may schedule an activity process of the application to manage the lifecycle of each application.

The window manager is configured to manage a window program. The window manager may obtain a display size, determine whether a status bar exists, lock a screen, take a screenshot, and the like.

The content provider is configured to store and obtain data, and enable the data to be accessed by an application. The data may include videos, images, audio, calls made and answered, browsing histories, bookmarks, address books, and the like.

The view system includes visual controls, for example, a control for displaying a text and a control for displaying a picture. The view system may be configured to construct an application. A display interface may be formed by one or more views, for example, a display interface including an SMS message notification icon, may include a view for displaying a text and a view for displaying a picture.

The phone manager is configured to provide a communication function of a mobile phone such as call state management (including getting through, hang-up, and the like).

The resource manager provides various resources, such as a localized character string, an icon, a picture, a layout file, and a video file for an application.

The notification manager enables an application to display notification information in a status bar, and may be configured to convey a notification-type message. The displayed notification information may automatically disappear after a short stay without user interaction. For example, the notification manager is configured to notify download completion, provide a message reminder, and the like. The notification manager may alternatively be a notification that appears in a top status bar of a system in a form of a graph or a scroll bar text, for example, a notification of an application running in the background, or a notification that appears on a screen in a form of a dialog window. For example, prompt text information is presented in the status bar, an alert sound is given, the mobile phone vibrates, and an indicator light flashes.

The Android™ runtime includes a core library and a virtual machine. The Android™ runtime is responsible for scheduling and managing of an Android system.

The core library includes two parts: One part is a functional function that needs to be invoked in a Java language, and another part is an Android core library.

The application layer and the application framework layer run in the virtual machine. The virtual machine executes Java files of the application layer and the application framework layer as binary files. The virtual machine is configured to perform functions such as object lifecycle management, stack management, thread management, security and exception management, and garbage collection.

As shown in FIG. 6, the system library may include a plurality of functional modules, such as a surface manager (surface manager), a three-dimensional graphics processing library (for example, OpenGL ES), a two-dimensional graphics engine (for example, SGL), and a media library (Media Libraries).

The surface manager is configured to manage a display subsystem and provide fusion of 2D and 3D layers for a plurality of applications.

The media library supports playback and recording in a plurality of common audio and video formats, a static image file, and the like. The media library may support a variety of audio and video encoding formats, such as MPEG4, H.264, MP3, AAC, AMR, JPG, and PNG.

The three-dimensional graphics processing library is configured to implement three-dimensional graphics drawing, image rendering and composition, layer processing, and the like.

The 2D graphics engine is a drawing engine for 2D drawing.

In this embodiment of this application, the system library further includes a scanning control service, and the scanning control service may adjust a scanning sequence based on an application identifier and a screen display direction.

In some embodiments, the scanning control service includes a manager and a controller.

The manager determines, based on a package name of a currently run application, a hot zone in the application and a first hot zone position (also referred to as a first area) of the hot zone in an initial screen display direction; detects whether the mobile phone rotates in the gravity direction and the rotation angle in the gravity direction through the gyroscope sensor 580B; and obtains, based on the initial screen display direction and the rotation angle, a second hot zone position (also referred to as the first area) after the mobile phone rotates to the screen display direction. The manager determines the scanning sequence based on the hot zone position, and sends the scanning sequence to the controller. The controller adjusts a signal sampling direction of the TP chip based on the obtained scanning sequence (for example, the signal sampling direction is adjusted from left to right to right to left scanning).

The kernel layer is a layer between the hardware and the software. The kernel layer includes at least a hardware driver, to drive hardware to work.

As shown in FIG. 6, the kernel layer includes the TP chip driver, a display driver (display driver), a graphics process-ing unit driver (graphics processing unit driver, GPU driver), an audio driver, a sensor driver, and the like.

The TP chip driver is configured to drive a TP chip to periodically scan channels on the touch screen, to listen to a touch operation input from the touch screen of the mobile phone, and report a touch parameter generated through the touch operation to another module for algorithm processing and transmission.

The following describes an example of a working procedure of the mobile phone based on the touch scanning method provided in this application. The scanning control service obtains an application identifier of the currently run application, and determines the hot zone in the application and an initial screen display direction of the mobile phone at a current angle based on the application identifier. In a running process of the application, if the mobile phone undergoes angle rotation or deviation, for example, when the mobile phone rotates from a portrait state to a landscape state, or when the mobile phone rotates by 180° in the gravity direction to adjust from the landscape state to another landscape state, or when the mobile phone rotates from the landscape state to the portrait state, the gyroscope sensor 580B built in the mobile phone sends the detected rotation angle of the mobile phone in the gravity direction to the scanning control service. The scanning control service determines a current screen display direction based on the initial screen display direction and the rotation angle of the mobile phone in the running process of the application, and obtains the second hot zone position of the hot zone on the touch screen after the mobile phone rotates to the foregoing screen display direction. Then, the scanning control service adjusts the scanning sequence based on the hot zone position, and invokes the TP chip driver in the kernel layer, to start the TP chip to respond to a sampling operation performed based on the adjusted scanning sequence. In a sampling process, the TP chip periodically scans each channel on the touch screen in sequence. At the end of each periodicity, the TP chip reports all scanning data obtained by scanning channels.

With reference to the accompanying drawings, an application scenario of the touch scanning method provided in embodiments of this application is described below by using an example in which the electronic device is a mobile phone with the foregoing hardware structure and software structure. After the mobile phone starts, a function of dynamically adjusting the scanning sequence implemented based on the touch scanning method provided in embodiments of this application may be automatically enabled, so that the scanning sequence can be adaptively adjusted when the hot zone position changes, and periodic touch sampling is performed on the touch screen in the adjusted scanning sequence.

For example, when the mobile phone starts, the function of "dynamically adjusting the scanning sequence" is automatically enabled. After the mobile phone starts, the function of "dynamically adjusting the scanning sequence" of the mobile phone is enabled. During use of the mobile phone by the user, the mobile phone continuously or periodically detects whether the first hot zone position of the hot zone displayed on the touch screen changes. If a change occurs, the mobile phone adjusts the scanning sequence based on the second hot zone position after the hot zone changes, and performs periodic touch sampling on the touch screen in the adjusted scanning sequence.

It should be noted that, the foregoing descriptions of a manner in which the mobile phone automatically enables the function of "dynamically adjusting the scanning sequence" is merely an example. Alternatively, the mobile phone may enable the function of "dynamically adjusting the scanning sequence" when the mobile phone detects that an application is started, or detects a change in the screen display direction during running of the application, or detects an indication to start dynamic scanning from the user, or the like. This specific manner is not limited in embodiments of this application.

In some embodiments, the mobile phone is preset with an application management list. The application management list includes a blacklist and a whitelist, where the blacklist includes application identifiers of applications not using the touch scanning method provided in embodiments of this application. The white list includes application identifiers of applications using the touch scanning method provided in embodiments of this application. After starting an application, the mobile phone determines whether the application is included in the blacklist or the whitelist based on an application identifier of the application. If the mobile phone determines that the application is in the whitelist, the scanning sequence is dynamically adjusted based on the touch scanning method provided in embodiments of this application. On the contrary, if the mobile phone determines that the application is in the blacklist, the scanning sequence is dynamically adjusted without using the touch scanning method provided in embodiments of this application. For example, if the mobile phone determines that the application is in the blacklist, the mobile phone may perform periodic touch sampling on the applications in the blacklist by using a fixed scanning sequence in conventional technologies, or the mobile phone may perform periodic touch sampling on the applications in the blacklist by using a scanning sequence when the mobile phone runs a previous application.

For example, when the mobile phone starts, the function of "dynamically adjusting the scanning sequence" is automatically enabled. An embodiment of this application provides a touch scanning method. The method can realize the function of "dynamically adjusting the scanning sequence", and includes S701 to S709 shown in FIGS. 7 and S710 to S717 shown in FIG. 8.

S701: A mobile phone displays, after starting, a first interface on a touch screen.

The first interface may include at least one of the following interfaces: a mobile phone desktop and a first application interaction interface.

Specifically, if the mobile phone desktop is entered after the mobile phone starts, the mobile phone uses the mobile phone desktop as the first interface. Alternatively, if a first application run by the mobile phone before closing the screen is entered after the mobile phone starts, the mobile phone uses the first application interaction interface as the first interface.

In this step, the first application interaction interface is any interface that may be for performing interaction in a running process of the first application.

For example, when the first application is a "game" application, the first application interaction interface may be a game battle interface, a game function interface, or a game main interface.

To provide an example rather than a limitation, the first application may also include software, such as an input method, a chat application, a shopping application, a short video social application, a camera, a calendar, a map, a video, music, an SMS message, or a gallery. A type of the first application is not limited in embodiments of this application.

When the first interface is the mobile phone desktop, the first interface includes a hot zone. When the first interface is the first application interaction interface, the first interface may include a hot zone, or may not include the hot zone.

S702: The mobile phone performs, in a first scanning sequence, periodic touch sampling on the touch screen on which the first interface is displayed.

For a specific method for the mobile phone to perform periodic touch sampling on the touch screen in the scanning sequence, refer to the touch sampling method in the introduction of the touch screen and conventional technologies. This is not described herein in embodiments of this application.

The first scanning sequence (also referred to as a first scanning manner) may be a default scanning sequence when the mobile phone starts, or may be a dynamic scanning sequence determined based on the hot zone on the touch screen of the first interface displayed by the mobile phone. This is not limited in embodiments of this application. For a process of determining the scanning sequence based on the hot zone, refer to the relevant descriptions below.

Figure 9:
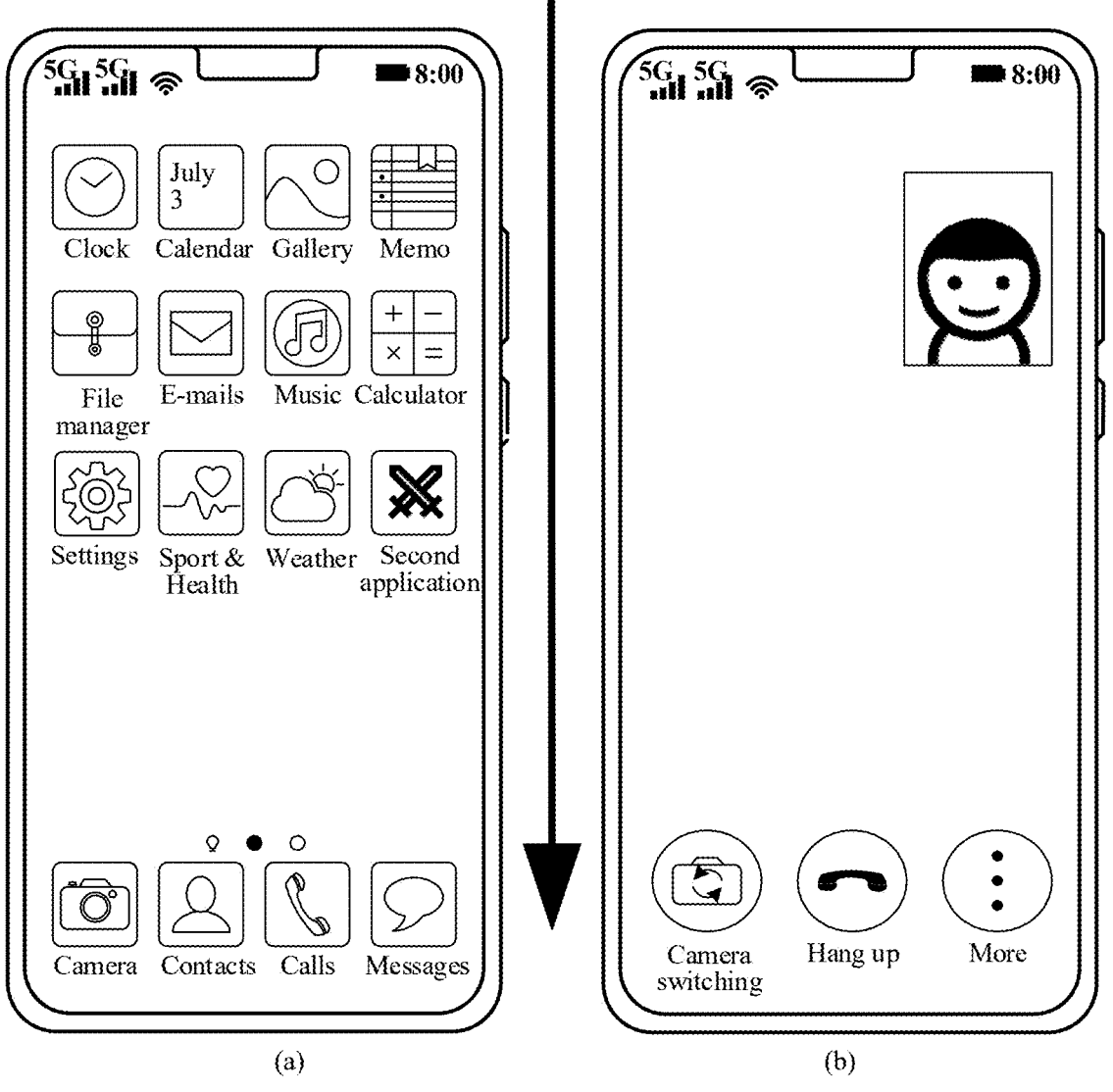
FIG. 9 is a schematic diagram of a first scanning sequence according to an embodiment of this application.

For example, as shown in FIG. 9, when the first interface displayed by the mobile phone is a mobile phone desktop shown in (a) in FIG. 9 or a first application interaction interface shown in (b) in FIG. 9, the first scanning sequence is scanning from top to bottom. Therefore, the mobile phone performs periodic sampling from top to bottom on the touch screen on which the first interface is displayed.

S703: The mobile phone detects a first operation performed by a user in the first interface, where the first operation indicates to start a second application.

For example, the first operation includes an operation by the user to touch an icon of the second application on the mobile phone desktop, a voice indication by the user, or a gesture operation by the user, or the like.

In some embodiments, when the first operation is the operation by the user to touch the second application on the mobile phone desktop, the first interface is the mobile phone desktop, and the mobile phone displays the icon of the second application on the mobile phone desktop. A finger of the user touches the icon of the second application to indicate the mobile phone to start the second application.

In some embodiments, when the first operation is the voice indication by the user, the user gives a voice command such as "start the second application", "switch to the second application", or "enter a game mode" within a preset distance range of the mobile phone, to indicate the mobile phone to start the second application.

In some embodiments, when the first operation is the gesture operation by the user, for example, the gesture operation is that the user marks a gesture command indicating to start the second application in the first interface, where the gesture command may be a circle trajectory, a wave line trajectory, a cross line trajectory, or the like that is initially set or customized by the user. Alternatively, the gesture operation is a tap operation performed by the user on the mobile phone.

After the user gives the indication of the first operation based on foregoing manners, the mobile phone detects the first operation, and then performs S704.

S704: The mobile phone starts, in response to the first operation, the second application and displays a second interface.

The second application includes software, such as a game, an input method, a chat application, a shopping application, a short video social application, a camera, a calendar, a map, a video, music, an SMS message, or a gallery. A type of the second application is not limited in embodiments of this application.

The second application is an application different from the first application. The mobile phone starts the second application in response to the first operation. In this case, the first interface of the mobile phone is switched to the second interface. In addition, the first interface and the second interface are different interfaces.

For example, the second interface is a game battle interface of a game application (the second application), and that the first interface is switched to the second interface may include: switching the mobile phone desktop to the game battle interface or switching the first application interaction interface to the game battle interface.

In a first application scenario, that the first interface is switched to the second interface refers to switching the mobile phone desktop to the game battle interface.

Figure 10:
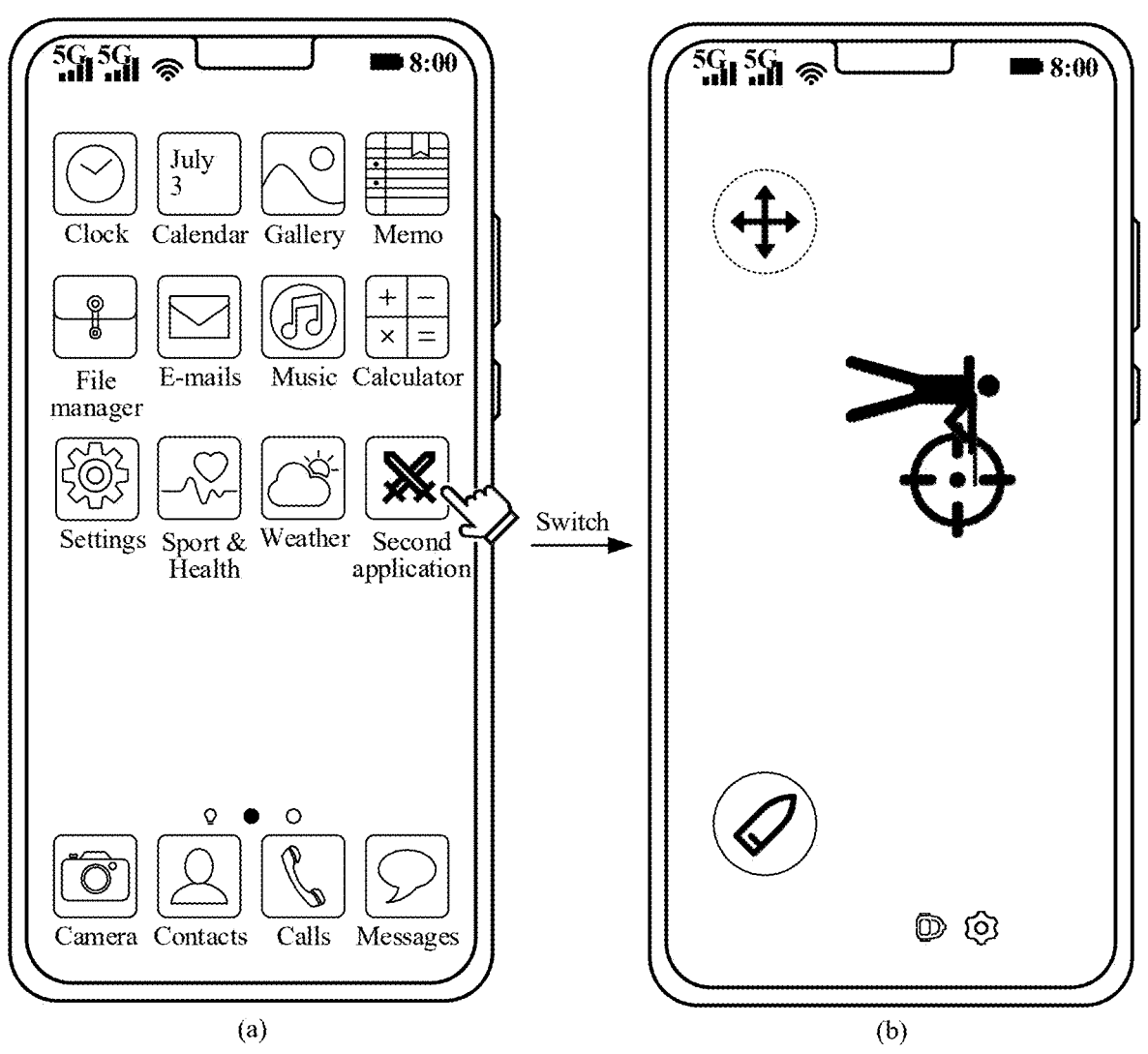
FIG. 10 is a first schematic diagram of switching from a first interface to a second interface according to an embodiment of this application.

As shown in FIG. 10, the mobile phone receives the first operation input by the user on a mobile phone desktop (the first interface) shown in (a) in FIG. 10, where the first operation indicates the mobile phone to open the game application (the second application). Then, the mobile phone opens the game application, and enters a game battle interface (the second interface) shown in (b) in FIG. 10.

The second interface is any interface that may be for performing interaction in a running process of the second application. In other words, interfaces of the second application such as a login interface, a main interface, a function interface, a setting interface, and a game battle interface, may all be used as the second interface.

Specifically, for example, the second application is the game application. The mobile phone first enters the game main interface after starting the game application, and the mobile phone detects a second operation performed by the user in the game main interface, where the second operation indicates to enter a game battle scene. Then, the mobile phone displays the game battle interface, where the game battle interface is the second interface.

In a second application scenario, that the first interface is switched to the second interface refers to switching the first application interaction interface to the game battle interface.

Figure 11:
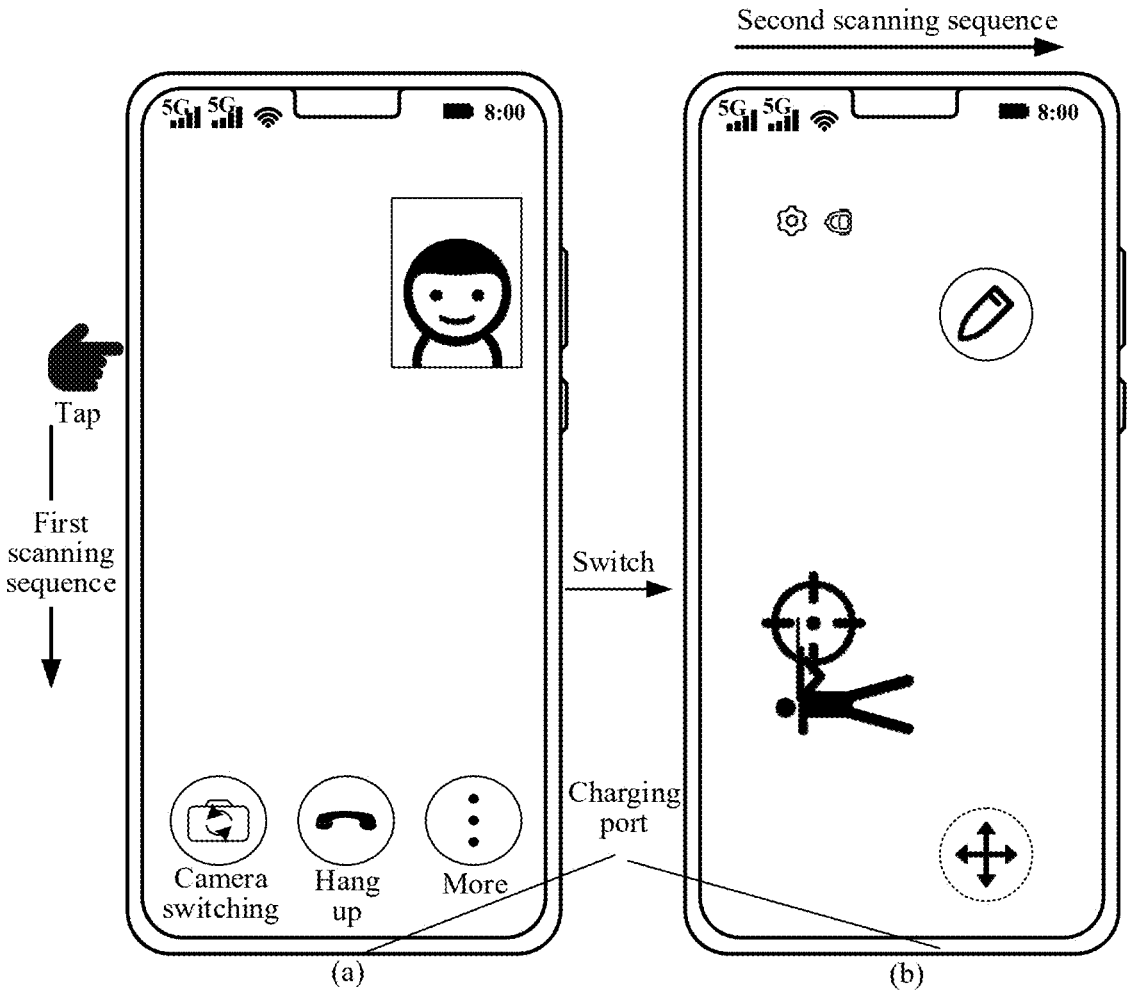
FIG. 11 is a second schematic diagram of switching from a first interface to a second interface according to an embodiment of this application.

As shown in FIG. 11, the mobile phone receives the first operation input by the user in a running interface of a chat application (the first application) shown in (a) in FIG. 11, for example, the first operation is a tap operation performed by the user on the mobile phone, where the first operation indicates the mobile phone to open the game application (the second application). Then, the mobile phone opens the game application, and enters a game battle interface (the second interface) shown in (b) in FIG. 11.

Through S701 to S704, the mobile phone switches the first interface to the second interface. Because an interface on the touch screen changes, a hot zone and a position of the hot zone in the interface may also change. Therefore, after the mobile phone performs S704 to display the second interface, the mobile phone performs S705 to obtain the hot zone position on the touch screen.

S705: The mobile phone obtains a first hot zone position of the hot zone displayed on the touch screen after the first interface is switched to the second interface.

In this embodiment, the hot zone is a trigger area on the touch screen in which an interaction event can be generated when the finger touches the touch screen. When the user performs an operation such as touch, pressing or sliding on the hot zone, the interaction event (such as a touch event or a sliding event) corresponding to the hot zone is triggered, and then the mobile phone executes the interaction event.

The hot zone may include any one of the following: a high-frequency trigger area, a preset specific area, a default bottom area, an area with a high response delay requirement, or the like.

Specifically, for example, the hot zone is the high-frequency trigger area. The mobile phone uses an area in which a quantity of times of responding to the interaction event on the touch screen meets a preset condition as the hot zone. The preset condition may be that a frequency is greater than or equal to a threshold. The threshold may be: On average, 2, 1, 0.5, 0.2, . . . , or 0.1 touch events or sliding events are responded to per second. In addition, the threshold may also be an average value, a median, or the like of frequencies of the touch event or the sliding event that areas on the touch screen respond to in the foregoing period of time. The frequency may also be a quantity of frequencies, a quantity of times, or the like.

Because the hot zone is the high-frequency trigger area, a quantity of triggered times of an interaction event in the hot zone has a high frequency, and has a large proportion in a quantity of triggered times of all interaction events in the entire second interface. Therefore, the scanning sequence is adjusted based on the position of the hot zone, to affect the hardware sampling time consumption consumed when an interaction event generated at the position of the hot zone is collected, so that a beneficial effect of significantly affecting hardware sampling time consumption consumed when touch events generated at all positions in the second interface are collected can be achieved. If the hardware sampling time consumption is reduced, a touch response speed of the touch screen is correspondingly accelerated.

The obtaining the first hot zone position includes a plurality of manners.

In some embodiments, the first hot zone position is obtained from a setting file of the second application. For example, the setting file stores a first hot zone position of at least one hot zone (for example, the high-frequency trigger area, the preset specific area, the default bottom area, or the area with the high response delay requirement) in the second interface. Each hot zone corresponds to a hot zone identifier (for example, a key identifier), and the mobile phone determines the hot zone and a touch event in response to touching the hot zone based on the hot zone identifier. Alternatively, the setting file stores a mapping relationship table between a package name of the second application and the first hot zone position, and the mobile phone determines, based on the mapping relationship, the first hot zone position of the hot zone after the second application is opened.

In some embodiments, the hot zone is obtained from an area in which a frequency of an interaction event (for example, the touch event or the sliding event) that the touch screen responds to in a period of time meets the preset condition in the process in which the mobile phone runs the second application. For example, when the second application starts to be run, the first hot zone position is not determined in the interface. After the second application is run for a period of time, the mobile phone obtains a frequency of a touch operation or a sliding operation detected in each area on the touch screen in the foregoing period of time (or obtains a frequency of the touch event or the sliding event that each area on the touch screen responds to in the foregoing period of time). The mobile phone uses the area in which the frequency meets the preset condition as the hot zone, and obtains the first hot zone position of the hot zone.

S706: The mobile phone adjusts the first scanning sequence based on the first hot zone position to obtain a second scanning sequence, and performs, in the second scanning sequence, periodic touch sampling on the touch screen on which the second interface is displayed.

The second scanning sequence is also referred to as a second scanning manner, and the mobile phone may adjust the first scanning sequence in the following adjustment manners:

In a first design manner, the adjustment manner includes: The mobile phone determines a farthest drive electrode farthest from the first hot zone position on the touch screen, and starts scanning in a direction of the first hot zone position starting from the farthest drive electrode. Each time the mobile phone scans a drive electrode, all receive electrodes intersecting with the drive electrode receive scanning data generated by the drive electrode once, and then a row (or a column) of channels perpendicular to the second scanning sequence are scanned. When all the drive electrodes are scanned by the mobile phone, a display area of the entire touch screen is scanned.

In this design manner, compared with another scanning sequence, the obtained second scanning sequence can make an electrode in which the hot zone is located be scanned latest and a distance between the first hot zone position and the farthest drive electrode far. In this case, a delay from sampling to reporting in the hot zone is small, so that a touch response delay of the touch operation performed by the user in the hot zone is short, and touch response sensitivity is high.

In a second design manner, the adjustment manner includes: The mobile phone determines a nearest drive electrode closest to the first hot zone position on the touch screen, and starts scanning in the direction of the first hot zone position starting from the nearest drive electrode. In this design manner, compared with the another scanning sequence, the obtained second scanning sequence can make the electrode in which the hot zone is located be scanned earliest and a distance between the hot zone and the nearest drive electrode is close. In this case, a delay from sampling to reporting in the hot zone is large, so that a touch response delay of the touch operation performed by the user in the hot zone is long, and the touch response sensitivity is low. This design manner is applicable to a high-delay scenario (for example, applicable to an application that needs to increase a touch stickiness sensation).

In this way, the mobile phone can adjust a signal sampling direction by using the first hot zone position, so that touch sensitivity of both a high-delay requirement scenario and a low-delay requirement scenario is considered, to achieve a beneficial effect of flexibly adjusting the touch response speed.

By using the first design manner as an example, refer to FIG. 11 again. In (a) in FIG. 11, the mobile phone uses the first scanning sequence for the touch screen on which the chat application (the first application) is displayed, and the first scanning sequence is from top to bottom shown in FIG. 11. After the mobile phone starts the game application (the second application) and displays the game battle interface, a "move key" and a "shoot key" in the game battle interface are the hot zone. The mobile phone obtains positions of the "move key" and the "shoot key" to obtain the first hot zone position (a right side of the mobile phone shown in FIG. 11). Then, the mobile phone determines the farthest drive electrode farthest from the first hot zone position as a start of the scanning sequence, and starts scanning in the direction of the first hot zone position. Therefore, the adjusted second scanning sequence is from left to right shown in FIG. 11.

In some other embodiments, after the mobile phone determines the first hot zone position of the hot zone through S706, the mobile phone may not adjust the scanning sequence, in other words, the mobile phone still performs periodic touch sampling on the touch screen on which the second interface is displayed in the first scanning sequence. The mobile phone continuously or periodically detects whether a screen display direction changes. If the screen display direction changes, the mobile phone performs S707. In other words, compared with S706, the first scanning sequence is adjusted only when it is detected that the screen display direction changes in this embodiment. This embodiment is applicable to a scenario in which the user switches the mobile phone from a portrait state to a landscape state when opening the second application of the mobile phone. Specifically, when the interface of the second application in the landscape state is in forward display, the user rotates the mobile phone to the landscape state after opening the second application in the portrait state. If the mobile phone performs S706 in this scenario, the mobile phone needs to perform calculation once on the scanning sequence when the user opens the second application to display the second interface, and perform calculation once again on the scanning sequence when the mobile phone switches to the landscape state. Therefore, if a quantity of times of calculation of the mobile phone is too frequent, calculation costs of the mobile phone are increased. However, through use of this embodiment, a plurality of times of calculation may be avoided when the mobile phone undergoes both interface switching and a change in the screen display direction, thereby reducing the calculation costs.

Therefore, after the mobile phone performs S706 or S705, the mobile phone may perform S707 below.

S707: The mobile phone determines that the screen display direction changes.

The screen display direction includes screen landscape display and screen portrait display. Both the screen landscape display and the screen portrait display include two cases respectively. By using the portrait screen display as an example, the portrait screen display includes both portrait display with a charging port of the mobile phone downward and portrait display with a charging port of the mobile phone upward. For example, screen display directions of the mobile phone shown in FIG. 9 to FIG. 11 are all the screen portrait display with the charging port downward. For the two cases of the screen landscape display, refer to FIG. 14 for details.

In this step, the mobile phone has a capacity of detecting the change in the screen display direction. A change result of whether the screen display direction changes is for determining whether the position of the hot zone changes. For example, after the mobile phone starts the second application, a screen display direction of the second interface is a portrait state in a gravity direction. If the mobile phone detects that the screen display direction changes to a landscape state in the gravity direction, the mobile phone determines that the screen display direction changes, and then the mobile phone may determine, based on the change result, that the position of the hot zone on the touch screen changes.

In this step, the mobile phone may determine that the screen display direction of the second interface changes based on at least one of the following detection manners.

In a scenario, if the mobile phone detects that the mobile phone rotates, the mobile phone determines that the screen display direction changes.

The mobile phone may measure, through a gyroscope, rotation and deflection actions of the mobile phone to obtain interface deflection information, and determine whether the screen display direction changes based on the interface deflection information.

Specifically, rotation of the mobile phone includes various cases, for example, the mobile phone deflects at an angle from the gravity direction in the portrait state, the mobile phone deflects at an angle from a horizontal direction in the portrait state, the mobile phone deflects at an angle from the horizontal direction in the landscape state, or the mobile phone deflects at an angle from the gravity direction in the landscape state. The mobile phone detects, through the gyroscope, whether the mobile phone rotates in the gravity direction when the mobile phone is in the portrait state and whether the mobile phone rotates in the horizontal direction when the mobile phone is in the landscape state. If the gyroscope determines that the mobile phone undergoes angle deviation in the foregoing two cases, the gyroscope obtains rotation data of the mobile phone, where the rotation data includes a rotation angle, a rotation direction, and the like. The portrait state means that the mobile phone is vertically placed. For example, the user holds the mobile phone or fixes the mobile phone through a mobile phone holder. An angle between the touch screen of the mobile phone in the portrait state and a horizontal plane is within a first range, where the first range is a range of about 90°. For example, the first range includes any angle within [70°, 110°]. The landscape state means that the mobile phone is horizontally placed. For example, the user places the mobile phone on a desktop. An angle between the touch screen of the mobile phone in the landscape state and the horizontal plane is within a second range, where the second range is a range close to 0. For example, the second range includes any angle within [0°, 20°].

It should be noted that, the second interface is deflected only when the rotation angle of the mobile phone is greater than or equal to a deflection threshold. In other words, after the mobile phone deflects and generates the rotation angle and the rotation direction of the mobile phone, the mobile phone needs to determine whether the rotation angle is sufficient to cause the second interface to deflect. For example, the mobile phone rotates by 20° in the gravity direction, and the rotation angle does not reach the deflection threshold for changing the screen display direction, so that the second interface is not deflected. Therefore, after the rotation data of the mobile phone is collected in this embodiment, it is also necessary to obtain an interface deflection direction and an interface deflection angle based on the rotation angle and the rotation direction in the rotation data, to determine whether the screen display direction changes based on the interface deflection direction and the interface deflection angle.

The following lists examples of four change results of the screen display direction when the mobile phone rotates and deflects.

Figure 12:
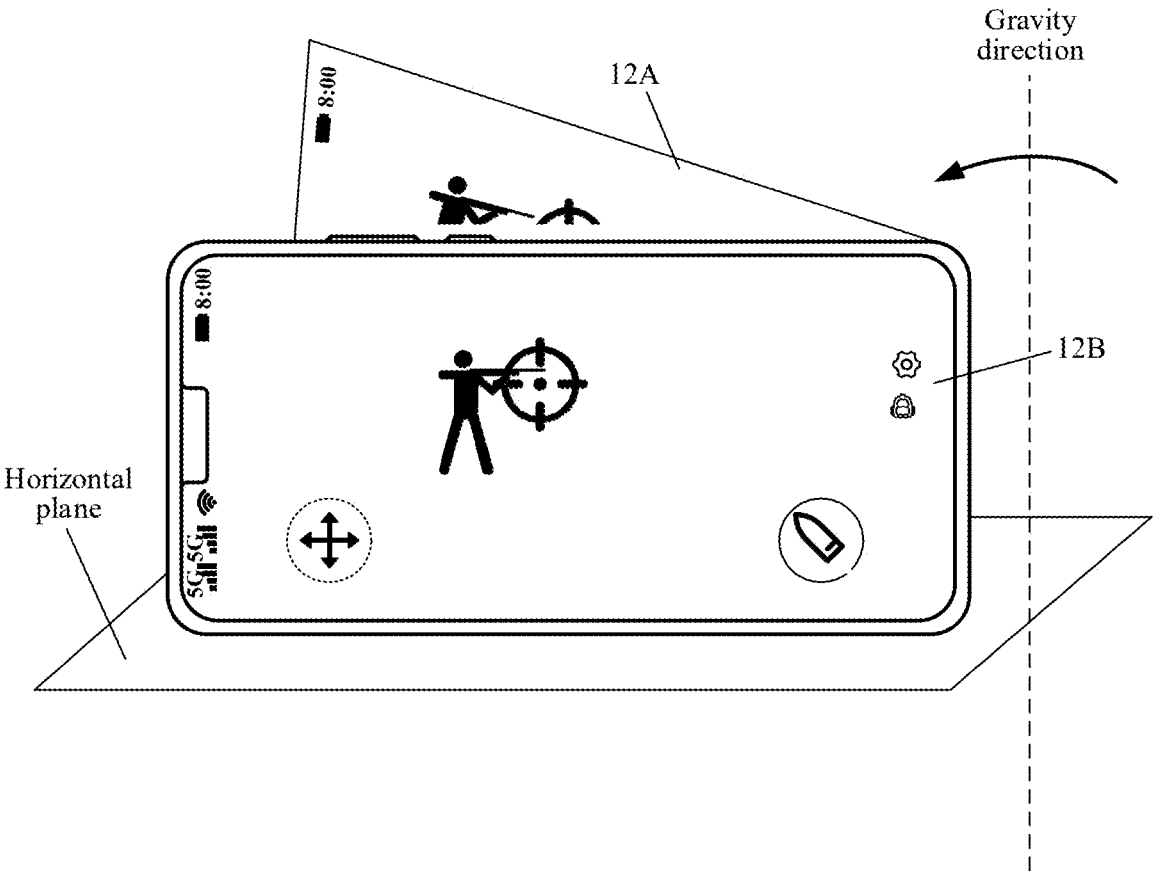
FIG. 12 is a schematic diagram of a screen display direction in a first mobile phone rotation manner according to an embodiment of this application.

In a first rotation manner of the mobile phone, for an interface change of the mobile phone in the portrait state undergoing angle deviation with the gravity direction as an axis, refer to FIG. 12. The portrait state shown in FIG. 12 is described as follows: The angle between the touch screen and the horizontal plane is 90°. A second interface 12A displayed on the touch screen in the portrait state is shown in FIG. 12. When the mobile phone deflects counterclockwise by 45° with the gravity direction as the axis, a second interface 12B displayed by the mobile phone is shown in FIG. 12. It can be seen that, screen display directions of the second interface 12A and the second interface 12B are consistent, which indicates that the mobile phone does not undergo interface deflection. In other words, the rotation angle of the mobile phone is 45°, the rotation direction of the mobile phone is counterclockwise, and the interface deflection angle of the mobile phone is 0°. Therefore, it can be determined that the screen display direction does not change.

Figure 13:
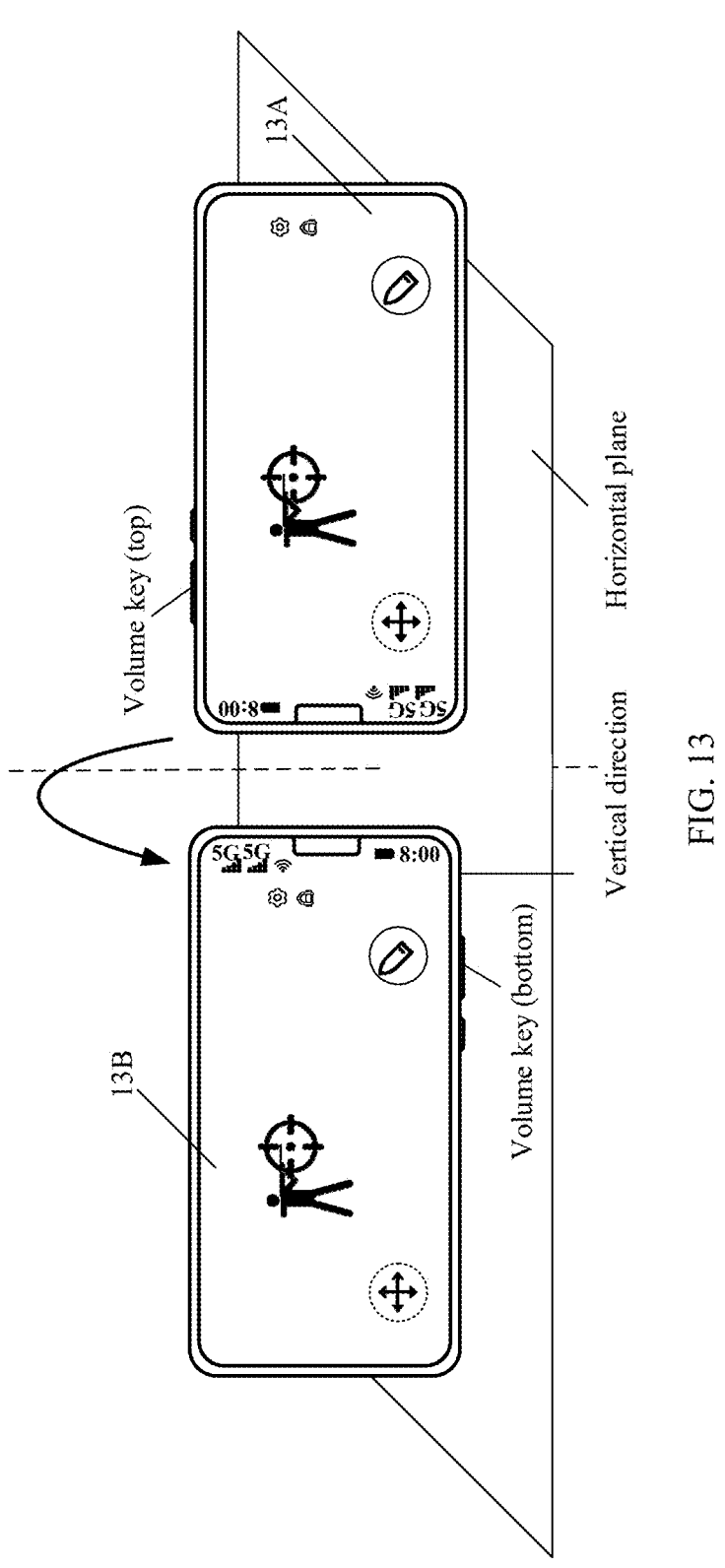
FIG. 13 is a schematic diagram of a screen display direction in a second mobile phone rotation manner according to an embodiment of this application.

In a second rotation manner of the mobile phone, for an interface change of the mobile phone in the portrait state undergoing angle deviation with the horizontal direction as an axis, refer to FIG. 13. The portrait state shown in FIG. 13 is described as follows: The angle between the touch screen and the horizontal plane is also 90°. A second interface 13A displayed in the portrait state is shown in FIG. 13. When the mobile phone deflects counterclockwise by 180° with the horizontal direction as the axis, a second interface 13B displayed by the mobile phone is shown in FIG. 13. It can be seen that, the second interface 13A is in forward display when a volume key is located at the top of the mobile phone, and the second interface 13B is in forward display when the volume key is located at the bottom of the mobile phone. In other words, the second interface 13A changes to the second interface 13B in this rotation manner, that is, the mobile phone undergoes interface deflection, and then it can be determined that the screen display direction changes.

Figure 14:
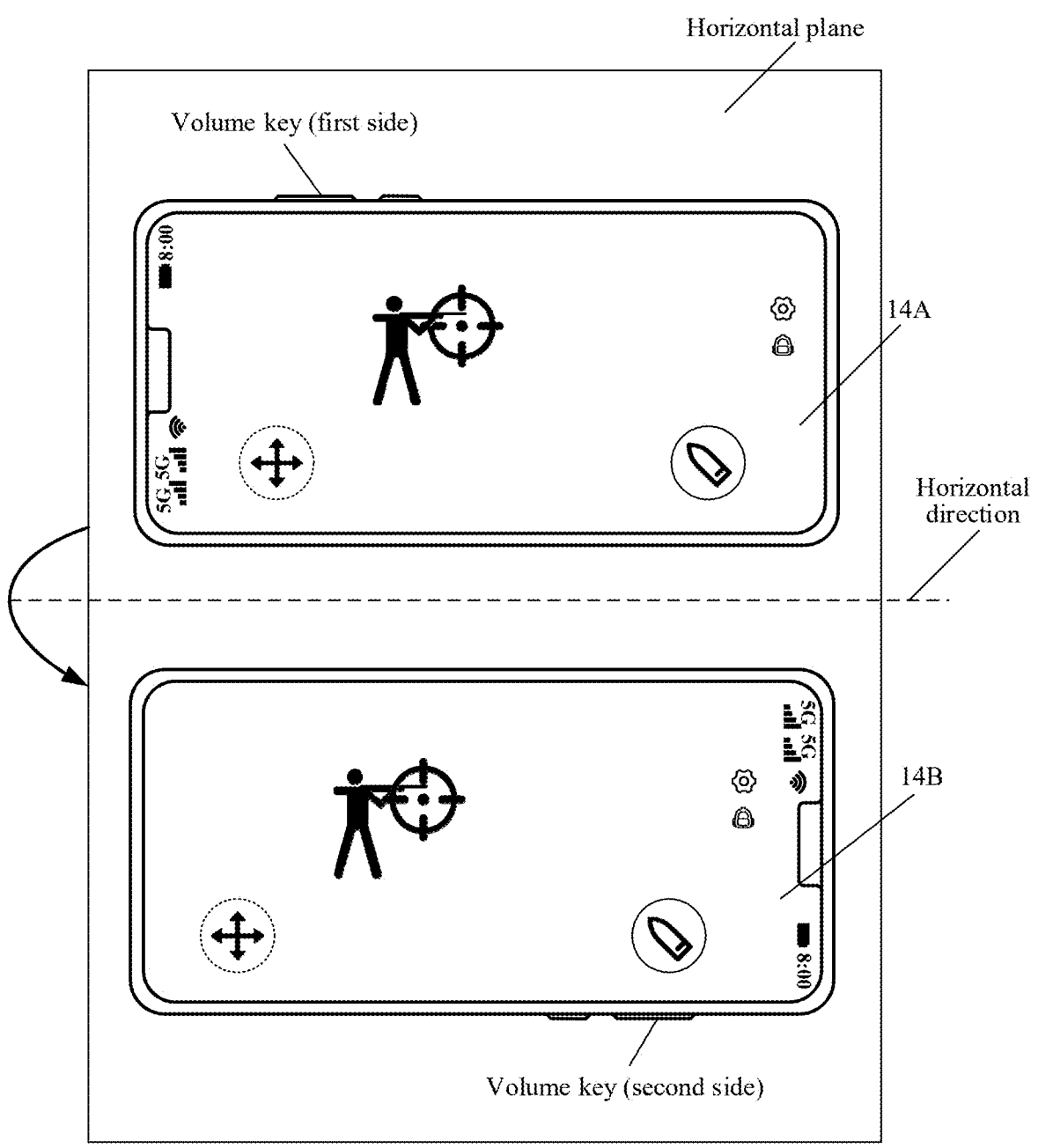
FIG. 14 is a schematic diagram of a screen display direction in a third mobile phone rotation manner according to an embodiment of this application.

In a third rotation manner of the mobile phone, for an interface change of the mobile phone in the landscape state undergoing angle deviation with the gravity direction as the axis, refer to FIG. 14. The landscape state shown in FIG. 14 is described as follows: The angle between the touch screen and the horizontal plane is 0°. A second interface 14A displayed on the touch screen in the landscape state is shown in FIG. 14. When the mobile phone deflects counterclockwise by 180° with the gravity direction as the axis, a second interface 14B displayed by the mobile phone is shown in FIG. 14. It can be seen that, the second interface 14A is in forward display when a volume key is located on a first side of the mobile phone, and the second interface 14B is in forward display when the volume key is located on a second side of the mobile phone. In other words, the second interface 14A changes to the second interface 14B in this rotation manner, that is, the mobile phone undergoes interface deflection, and then it can be determined that the screen display direction changes from a screen landscape display manner to another screen landscape display manner.

Figure 15:
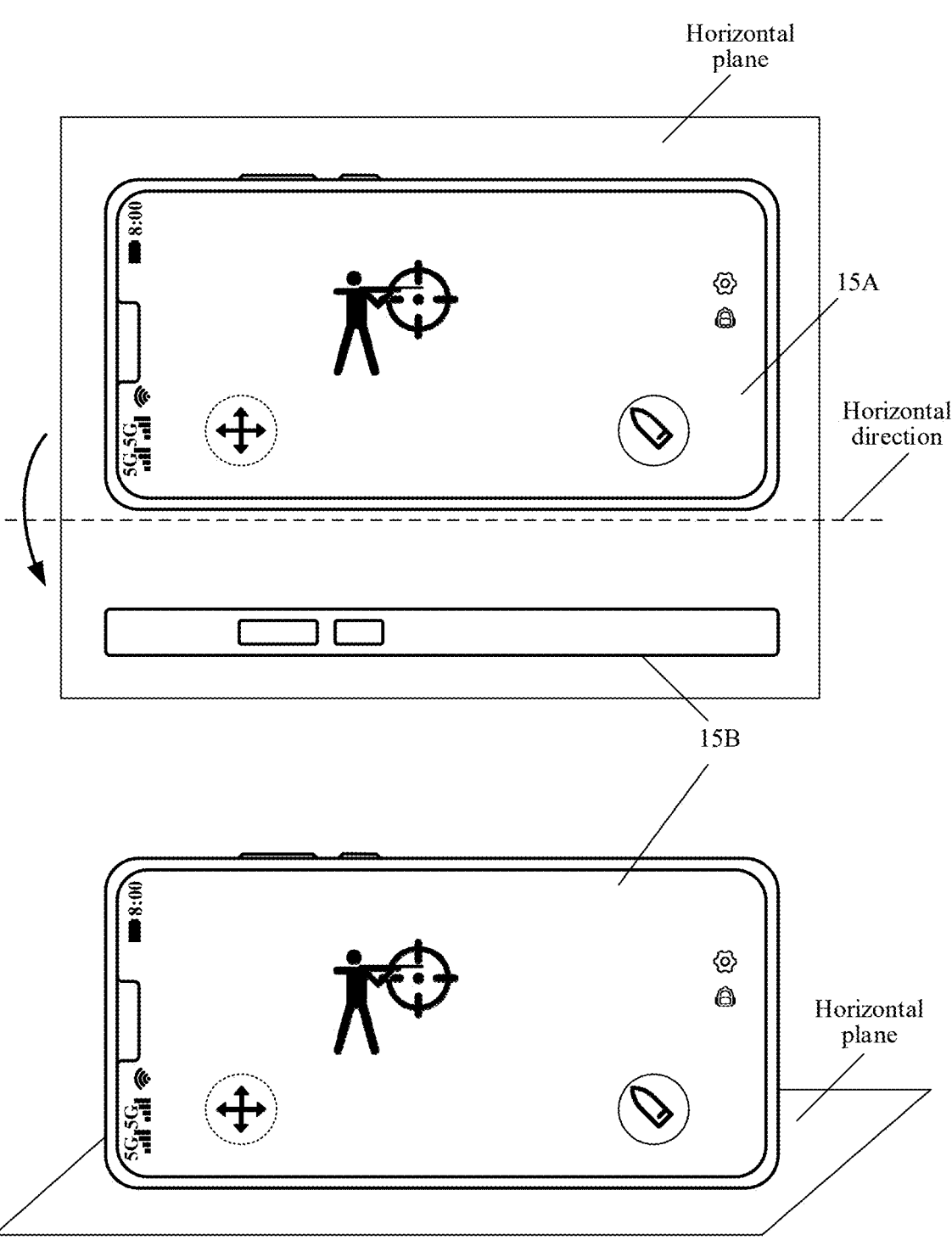
FIG. 15 is a schematic diagram of a screen display direction in a fourth mobile phone rotation manner according to an embodiment of this application.

In a fourth rotation manner of the mobile phone, for an interface change of the mobile phone rotating from the landscape state to the portrait state, refer to FIG. 15. The landscape state shown in FIG. 15 is described as follows: The angle between the touch screen and the horizontal plane is also 0°. A second interface 15A displayed in the landscape state is shown in FIG. 15. When the mobile phone deflects counterclockwise by 90° with the horizontal direction as the axis, a second interface 15B displayed by the mobile phone is shown in FIG. 15. It can be seen that, screen display directions of the second interface 15A and the second interface 15B are consistent, which indicates that the mobile phone does not undergo interface deflection. In other words, the rotation angle of the mobile phone is 90°, the rotation direction of the mobile phone is counterclockwise, and the interface deflection angle of the mobile phone is 0°. Therefore, it can be determined that the screen display direction does not change.

It can be learned from the foregoing embodiments that, the mobile phone may determine whether the screen display direction of the mobile phone changes by detecting whether the mobile phone rotates, where an operation performed by the user to rotate the touch screen is also referred to as a first trigger operation.

In another scenario, the mobile phone detects a third operation (which may also be referred to as the first trigger operation) performed by the user on the touch screen, where the third operation is for adjusting the display direction of the second interface, and the mobile phone determines that the screen display direction changes based on the detected third operation.

Figure 16:
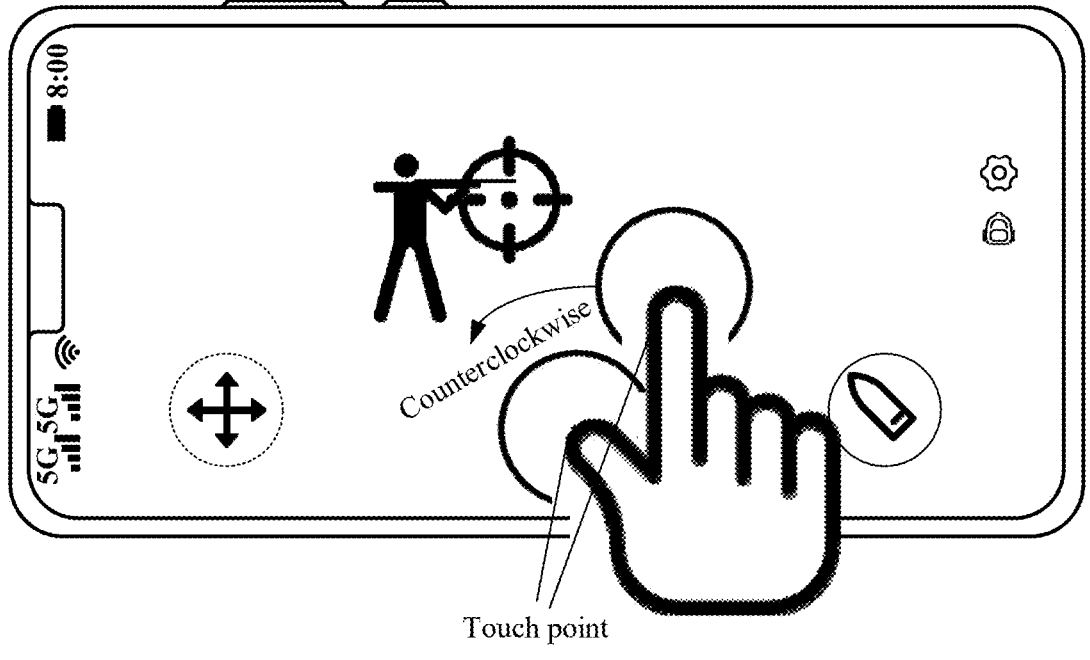
FIG. 16 is a schematic diagram of a third operation according to an embodiment of this application.

The third operation includes a gesture operation or a voice indication by the user to adjust the second interface. For example, the third operation is the gesture operation, and the gesture operation is shown in FIG. 16. When a thumb finger and an index finger of the user simultaneously touch the touch screen, a touch point is formed, and the touch point rotates in a counterclockwise direction to form a touch trajectory. In this case, when the mobile phone determines that the gesture is the gesture operation for adjusting the second interface based on the touch trajectory of the touch point, the mobile phone determines that the screen display direction changes. The third operation performed by the user is also referred to as the first trigger operation. In this case, the first trigger operation is for adjusting the display direction of the second interface when the touch screen is not rotated.

After determining that the screen display direction changes through the foregoing manner, the mobile phone performs S708.

S708: The mobile phone obtains a second hot zone position of the hot zone on the touch screen after determining that the screen display direction changes.

Refer to FIG. 13 again. In the second interface 13A, the hot zone is located in an area (the first hot zone position) close to the volume key on the touch screen. When the screen display direction changes, the position of the hot zone on the touch screen also changes. As shown in the second interface 13B, the hot zone is located in an area (the second hot zone position) away from the volume key on the touch screen, so that the mobile phone needs to obtain the second hot zone position of the hot zone after the position changes.

In some embodiments, the second hot zone position may be obtained from the setting file of the second application. For example, the setting file stores a second hot zone position of at least one hot zone (for example, coordinates of the high-frequency trigger area, the preset specific area, the default bottom area, or the area with the high response delay requirement in different screen display directions) in the second interface. Based on a current screen display direction, the mobile phone determines coordinates of the hot zone corresponding to the current screen display direction, to obtain the second hot zone position.

In some other embodiments, the second hot zone position may be determined based on the first hot zone position and the foregoing interface deflection information. For example, when the first hot zone position is represented in coordinates as (x, y), the interface deflection information is rotating clockwise by 180°, and then the mobile phone uses coordinates (x', y') obtained by rotating (x, y) clockwise by 180° along an origin (0, 0) as the second hot zone position.

In this embodiment, the first hot zone position may also be represented by orientation description. For example, the orientation description includes the top of the screen, the bottom of the screen, a left side of the screen, a right side of the screen, a center of the screen, four corners of the screen, and the like. If the first hot zone position is at the top of the screen, the interface deflection information is rotating clockwise by 180°, and then mobile phone uses the bottom of the screen obtained by rotating the top of the screen clockwise by 180° along the center of the screen as the second hot zone position.

S709: The mobile phone adjusts the second scanning sequence based on the second hot zone position to obtain a third scanning sequence, and performs, in the third scanning sequence, periodic touch sampling on the touch screen on which the second interface is displayed.

The third scanning sequence is also referred to as a third scanning manner. For a specific method for adjusting the second scanning sequence to obtain the third scanning sequence, refer to the method for adjusting the first scanning sequence to obtain the second scanning sequence in the introduction of S706. This is not described herein in embodiments of this application.

Figure 17:
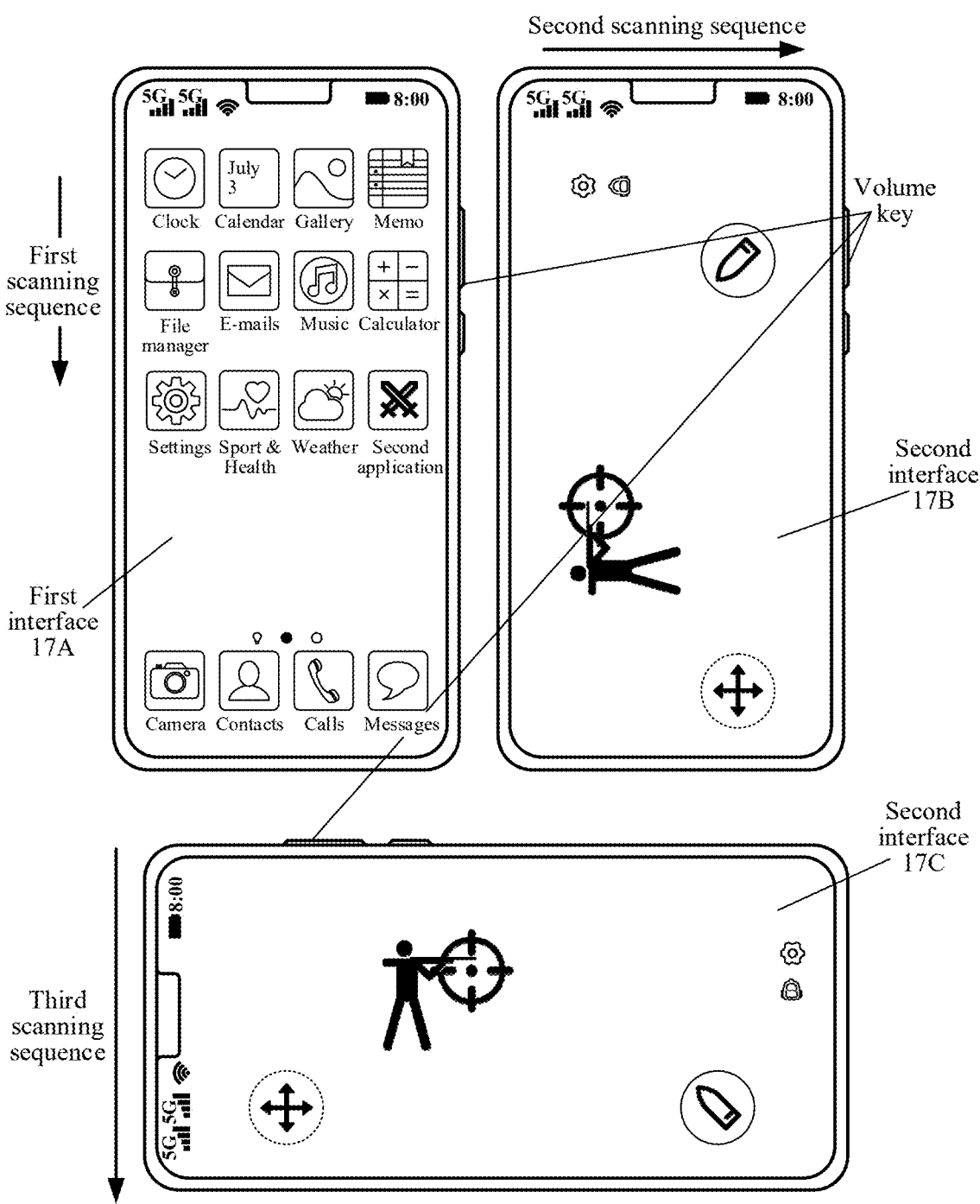
FIG. 17 is a schematic diagram of a first scanning sequence and a second scanning sequence according to an embodiment of this application.

As shown in FIG. 17, FIG. 17 includes a first interface 17A, a second interface 17B, and a second interface 17C. The second interface 17B is an interface displayed on the touch screen after the second application is switched to, and the second interface 17C is an interface displayed on the touch screen after the screen display direction changes.

In FIG. 17, it can be seen that the mobile phone performs touch sampling on the touch screen on which the first interface 17A is displayed in the first scanning sequence. When the first interface 17A is switched to the second interface 17B, interfaces displayed in the first interface 17A and the second interface 17B are different. Therefore, the mobile phone performs, in the second scanning sequence, sampling on the touch screen on which the second interface 17B is displayed. The second scanning sequence is a direction starting from a side away from the volume key and ending on a side of the volume key in the second interface 17B, that is, a scanning direction from left to right.

It can be seen from FIG. 17 that, volume keys of the first interface 17A and the second interface 17B are both on right sides of the interfaces, and a volume key of the second interface 17C is on an upper side of the interface, which indicate that a screen display direction of the second interface 17C is different from that of the first interface 17A (or the second interface 17B). Then, in the screen display direction of the second interface 17B, the second hot zone position is located on a side opposite to the volume key on the touch screen. To be specific, the volume key is located on the upper side of the interface, and the second hot zone position is located on a lower side of the touch screen. In this case, the first scanning sequence is adjusted based on the second hot zone position (the lower side of the touch screen) of the second hot zone position on the touch screen to obtain the second scanning sequence, so that the second scanning sequence is a direction starting from a side away from the volume key and ending on a side of the volume key in the second interface 17C, that is, a scanning direction from top to bottom shown in the second interface 17C.

S710: The mobile phone obtains scanning data after completing touch sampling in each periodicity.

In this embodiment, a drive electrode scanned earliest is used as a scanning starting point, and a drive motor scanned latest is used as a scanning ending point. Each time the mobile phone scans from the scanning start point to the scanning ending point, it indicates that the mobile phone completes touch sampling in one periodicity. In this way, during touch sampling, if scanning data obtained after each drive electrode is scanned is received by all the receive electrodes until the scanning ending point is scanned, touch sampling in one periodicity is completed. All the receive electrodes receive signals sent by all the drive electrodes, and report generated scanning data together.

S711: The mobile phone detects, from the scanning data, a touch signal generated when the user performs the touch operation in the second interface.

For the touch signal (also referred to as a capacitance signal), with reference to the foregoing descriptions of the touch screen and the touch sampling method in the conventional technologies, it can be learned that the finger performs the touch operation on the touch screen, and when the finger approaches or touches the touch screen, a capacitance signal at an intersection of channels near the finger becomes large. Therefore, the mobile phone determines, from the scanning data, a channel in which distribution of a capacitance signal is different from those of a front channel and a rear channel, to detect a capacitance signal generated at the touch point.

S712: The mobile phone obtains a generation position of the touch signal to obtain touch coordinates.

In some embodiments, the mobile phone may use an arrangement direction of drive electrodes as an x axis, use an arrangement direction of receive electrodes as a y axis, and use an intersection of electrodes at an upper left corner of the touch screen as an origin, to establish an x-y axis coordinate system. Based on which electrode the touch signal is distributed on, the mobile phone can determine a position (x, y) of the electrode in which the touch signal is located.

S713: The mobile phone determines a touch event triggered by the user on the touch screen based on the touch coordinates.

The touch event indicates that the touch signal is generated on the mobile phone. Specifically, when the user touches the touch screen of the mobile phone, the mobile phone generates one or a series of touch signals. If the user touches different positions or in different touch manners, events represented by touch signals are also different. Therefore, the mobile phone further needs to determine the position (for example, the touch coordinates) on which the touch signal is generated, to determine which event corresponds to the obtained touch event.

In some embodiments, based on a plurality of touch coordinates, the mobile phone may further determine a sliding event and a gesture event triggered by the user on the touch screen. A manner of dynamically adjusting the scanning sequence provided in this embodiment of this application may also be applied to adjusting touch response speeds of the sliding event and the gesture event. This is not limited in embodiments of this application.

Figure 18:
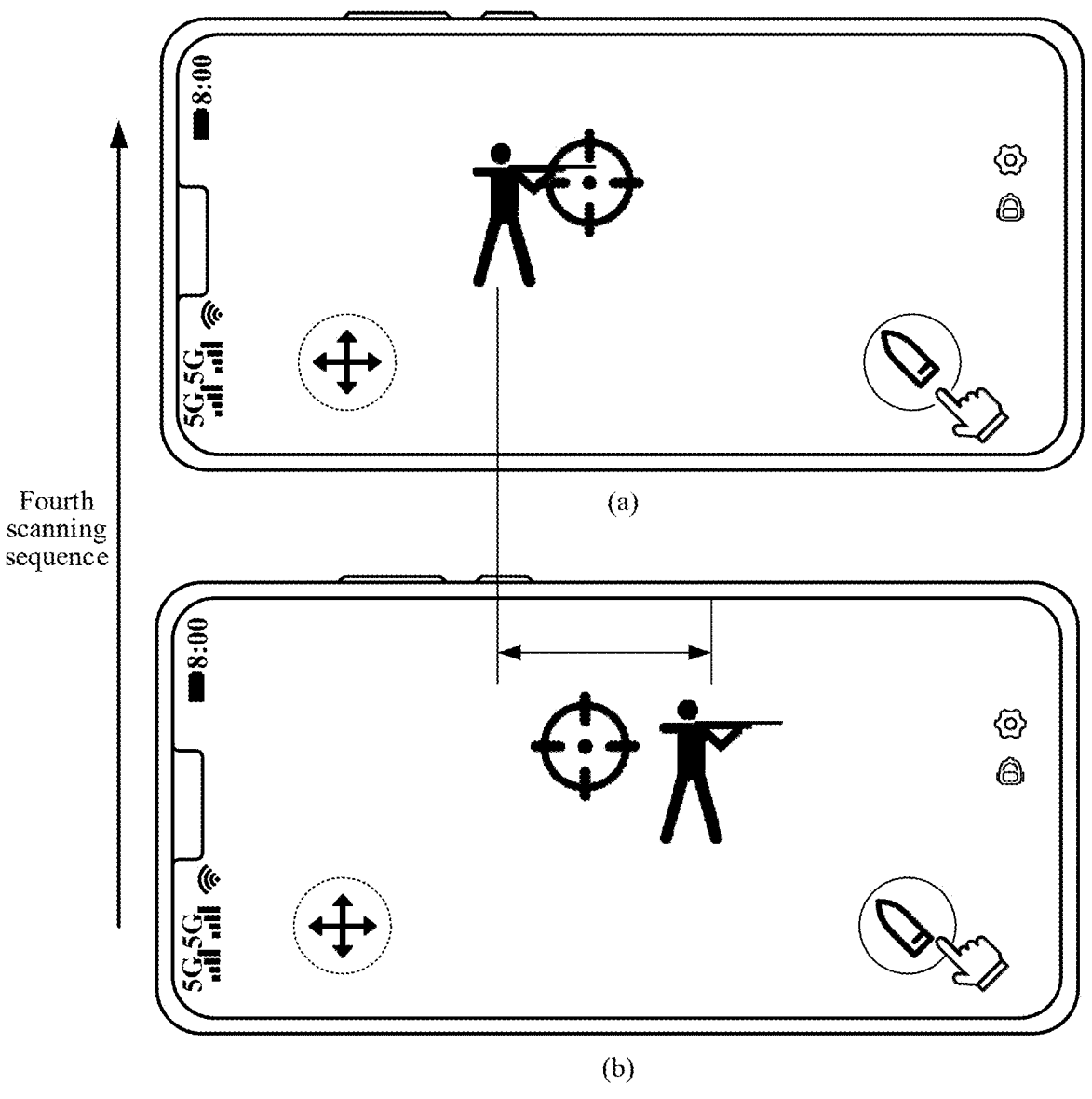
FIG. 18 is a schematic diagram of an effect using a first scanning sequence according to an embodiment of this application.

As shown in FIG. 18, in a landscape game battle interface, the touch screen is scanned in a preset fourth scanning sequence (also referred to as a preset scanning sequence). The fourth scanning sequence does not change with the screen display direction, and the fourth scanning sequence is a scanning sequence with a fixed scanning direction. The touch response speed of the mobile phone is shown in (a) in FIG. 18. The fourth scanning sequence is scanning from bottom to top of the screen, so that an electrode in which shoot key is located is quickly scanned when the user clicks the shoot key (the hot zone), but scanning data generated by the electrode is reported together after a last scanned electrode generates scanning data. Therefore, in a process from sampling to reporting, waiting time for reporting of the electrode in which the shoot key is located is long, directly affecting time for the mobile phone to subsequently determine the touch event based on the scanning data. Therefore, a delay from that the user clicks the shoot key to that a gun fires a bullet is long. As shown in (b) in FIG. 18, after the user clicks the shoot key, a character on the screen cannot be hit. Then, the user obviously feels that sensitivity of the shoot key is low, reaction time of the key is too long, and the game freezes, affecting game experience of the user.

Figure 19:
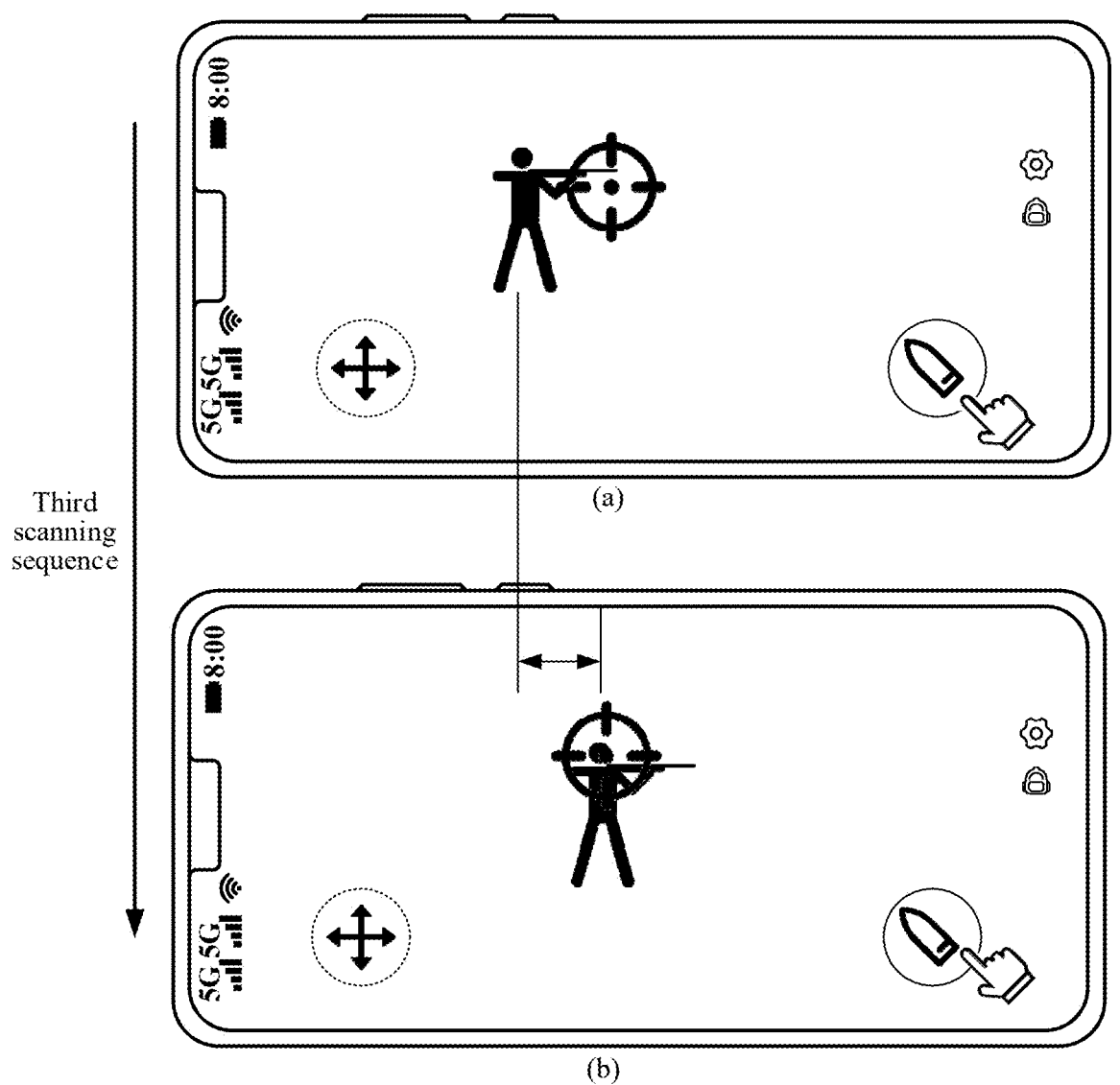
FIG. 19 is a schematic diagram of an affect using a second scanning sequence according to an embodiment of this application.

However, when the touch screen is scanned in the third scanning sequence, the touch response speed of the mobile phone is shown in (a) in FIG. 19. The third scanning sequence is set based on the position of the shoot key (the hot zone). Therefore, the third scanning sequence is scanning from bottom to top of the screen in the game battle interface. In this way, the shoot key can be scanned later. After the user clicks the shoot key, the electrode in which the shoot key is located is scanned later, and a quantity of to-be-scanned electrodes after the electrode is small. Therefore, waiting time for reporting from the scanning data generated by the scanned electrode to the scanning data generated by the last scanned electrode is short. Then, the time for the mobile phone to subsequently determine the touch event based on the scanning data is short. Therefore, the delay from that the user clicks the shoot key to that the gun fires the bullet in the game battle interface is short. As shown in (b) in FIG. 19, after the user clicks the shoot key, the character on the screen is hit, so that the user feels that sensitivity of the shoot key is high, and key reaction of the game is smooth, thereby having better interaction experience.

Refer to FIG. 8 again. In some embodiments, after S713 is performed, the method further includes S714 to S717.

S714: The mobile phone detects a fourth operation performed by the user in the second interface, where the fourth operation indicates to close the second application.

For example, the fourth operation (also referred to as a third trigger operation) includes key operations such as a finger touching the home (home) key, a return key, an application switching key, a shutdown key, and a sleep key. Alternatively, the fourth operation further includes the gesture operation, for example, the finger slides from the bottom of the screen to the center of the screen in the second interface.

S715: The mobile phone closes, in response to the fourth operation, the second application and displays a third interface.

Figure 20:
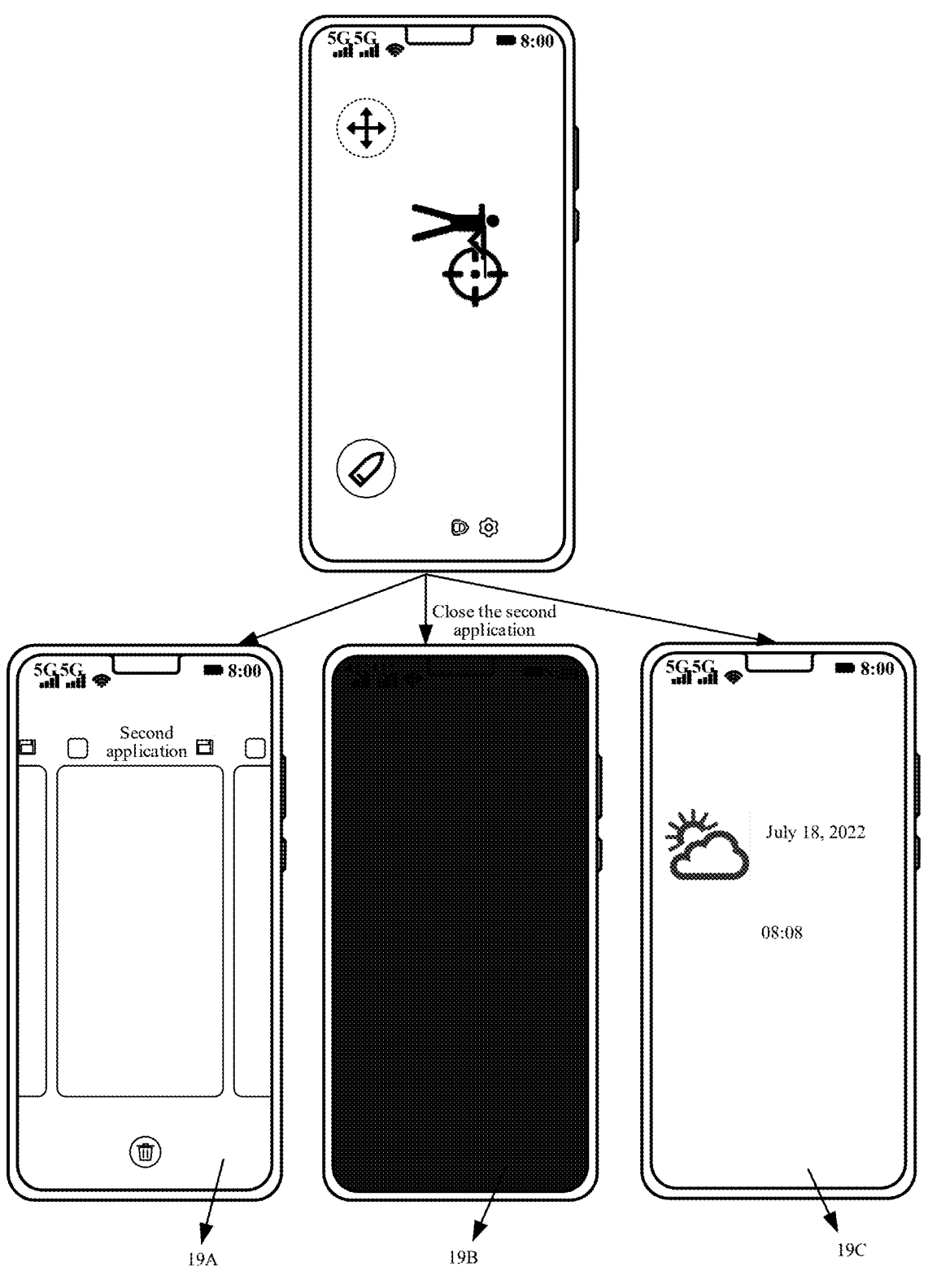
FIG. 20 is a schematic diagram of a third interface according to an embodiment of this application.

As shown in FIG. 20, the third interface includes an application switching interface 19A, an interface in which the mobile phone is in a screen-locked state, and the like.

The interface in which the mobile phone is in the screen-locked state may be a black screen interface 19B of the mobile phone, or may be a screen-locked interface 19C of the mobile phone.

S716: If the mobile phone determines that the touch screen does not include the hot zone when the third interface is not displayed on the touch screen, the mobile phone performs, in the third scanning sequence, periodic touch sampling on the touch screen on which the third interface is displayed.

In this step, when the mobile phone closes an application (namely, the second application), the mobile phone may continue to perform periodic touch sampling on the touch screen in an original scanning sequence (namely, the second scanning sequence). For a specific method for the mobile phone to perform periodic touch sampling on the touch screen, refer to the touch sampling method in the introduction of the touch screen. This is not described herein in embodiments of this application.

In some embodiments, after the mobile phone performs S715, S717 is directly performed.

S717: If the mobile phone determines that the touch screen does not include the hot zone when the third interface is not displayed on the touch screen, the mobile phone performs, in the preset fourth scanning sequence, periodic touch sampling on the touch screen on which the third interface is displayed.

In this embodiment, the mobile phone is preset with the fourth scanning sequence. Regardless of a direction of the scanning sequence used by the mobile phone in the second application, after the mobile phone closes the second application, the mobile phone performs periodic touch sampling on the touch screen in the preset fourth scanning sequence.

In summary, an embodiment of this application provides a touch scanning method. In the method, by detecting a position of a hot zone on a touch screen, a scanning sequence of the touch screen is determined. By dynamically adjusting a scanning sequence of touch sampling, an electrode in which the hot zone is located can be scanned at different moments in one scanning periodicity, and then waiting time for the electrode to report scanning data is also different, thereby affecting overall touch sampling time. In this way, in this embodiment of this application, dynamic adjustment can be performed on the touch sampling time, to meet touch sensitivity requirements in different delay scenarios. When a current application has a high sensitivity requirement for a touch response, a mobile phone can adjust the scanning sequence to allow a position of the hot zone to be scanned later, so that a distance between the position of the hot zone and a scanning ending point in one periodicity is short. After the electrode in which the hot zone is located is scanned, required waiting time for reporting is short. Therefore, when a user frequently performs a touch operation in the hot zone, total duration from collecting a touch signal to determining a touch event by the mobile phone is also short. In this way, a touch response delay can be reduced, and a touch response speed can be increased.

In addition, when the current application needs to have better use experience at low sensitivity (for example, a touch stickiness sensation needs to be increased by reducing the touch response speed), the mobile phone may adjust the scanning sequence to allow the position of the hot zone to be scanned earlier, to increase the touch response delay and reduce the touch response speed. In this way, by dynamically adjusting the scanning sequence, in this embodiment of this application, the touch response speed is adjusted without improving scanning hardware, and diversity of scanning manners is also increased, so that diverse requirements of different applications for touch response speeds can be met.

For example, if that t=2.5 ms is required when the entire screen is scanned after touching, response time T that can be adjusted when the scanning sequence is dynamically adjusted based on the position of the hot zone is any value within [0 s, 2.5 s]. T may be 0.5, 0.75, 1, 1.25, 1.5, 1.75, 2, 2.25, or the like. If the mobile phone adjusts the scanning sequence to allow the position of the hot zone to be scanned earlier, touch response time T is any value within [1.25 s, 2.5 s]. If the mobile phone adjusts the scanning sequence to allow the position of the hot zone to be canned later, the touch response time T is any value within [0 s, 1.25 s], that is, the response time T can be increased by any value within [1.25 s, 2.5 s].

An embodiment of this application provides an electronic device, where the electronic device includes a touch screen. The electronic device may perform a touch scanning method, including the following steps.

S1: The electronic device displays a first interface, and performs touch operation scanning on the touch screen in a first scanning manner (where S1 is equivalent to S701 to S702).

S2: Perform, when switching to a second interface, touch operation scanning on the touch screen in a second scanning manner associated with a first area, where a key hot zone in the second interface is located in the first area, and the first area is a position of the key hot zone in the second interface corresponding to the touch screen. The first scanning manner and the second scanning manner have different scanning directions.

In some embodiments, the method further includes: when the second interface is switched from portrait display to landscape display; or when the second interface is switched from the landscape display to the portrait display; or when the second interface is switched from display in a first landscape direction to display in a second landscape direction, where an angle between the first landscape direction and the second landscape direction is 180°, switching, by the electronic device, to a third scanning manner to perform touch operation scanning based on a second area in which the key hot zone is located (where the embodiments are equivalent to S707 to S709).

In some embodiments, the method further includes: starting, by the electronic device, a target application, where the second interface is an interface of the target application; obtaining, by the electronic device, an application identifier of the target application; obtaining an initial area of the hot zone corresponding to the target application on the touch screen based on the application identifier; and using, by the electronic device, the initial area as a second hot zone position if it is determined that a screen display direction does not change (where the embodiments are equivalent to S703 to S706).

An embodiment of this application provides an electronic device. The electronic device may include a memory and one or more processors. The memory is configured to store computer program code, and the computer program code includes computer instructions. When the processor executes the computer instructions, the electronic device may execute various functions or steps performed by the mobile phone in the foregoing method embodiments. For a structure of the electronic device, refer to the structure of the electronic device 500 shown in FIG. 5.

An embodiment of this application provides a touch chip. The touch chip may be configured to obtain the second hot zone position in the foregoing embodiments, adjust a scanning sequence based on the second hot zone position, and periodically scan the touch screen in the adjusted scanning sequence.

An embodiment of this application provides a touch screen. The touch screen may execute various functions or steps performed by the mobile phone in the foregoing embodiments. In some embodiments, the touch screen may include the foregoing touch chip.

An embodiment of this application further provides a computer-readable storage medium, including computer instructions, where the computer instructions, when run on an electronic device, enable the electronic device to execute various functions or steps performed by the mobile phone in the foregoing method embodiments.

An embodiment of this application further provides a computer program product, where the computer program product, when run on a computer, enables the computer to execute various functions or steps performed by the mobile phone in the foregoing method embodiments.

Through the descriptions of the foregoing implementations, a person skilled in the art may clearly understand that, for the purpose of convenient and brief description, only division of the foregoing functional modules is used as an example for description. In actual application, the foregoing
functions may be allocated to and completed by different
functional modules according to requirements. That is, an
inner structure of an apparatus is divided into different
functional modules to complete all or some of the functions
described above.

In a plurality of embodiments provided in this application,
it should be understood that the disclosed apparatus and
method may be implemented in other manners. For example,
the described apparatus embodiment is merely an example.
For example, the module or unit division is merely a logical
function division and may have other division during actual
implementations. For example, a plurality of units or com-
ponents may be combined or integrated into another appa-
ratus, or some features may be ignored or not performed. In
addition, the shown or discussed mutual couplings or direct
couplings or communication connections may be imple-
mented through some interfaces. The indirect couplings or
communication connections between the apparatus or units
may be implemented in electronic, mechanical, or other
forms.

The units described as separate parts may or may not be
physically separated. A part displayed as a unit may be one
physical unit or a plurality of physical units, located at the
one position, or may be distributed to different positions.
Some or all of the units may be selected based on actual
requirements to achieve the objectives of the solutions of the
embodiments.

In addition, functional units in embodiments of this appli-
cation may be integrated into one processing unit, or each of
the units may exist alone physically, or two or more units
may be integrated into one unit. The integrated unit may be
implemented in the form of hardware, or may be imple-
mented in the form of a software functional unit.

When the integrated unit is implemented in the form of
the software functional unit and sold or used as an indepen-
dent product, the integrated unit may be stored in a readable
storage medium. Based on such an understanding, the tech-
nical solutions in embodiments of this application essen-
tially, or the part contributing to conventional technologies,
or all or some of the technical solutions may be implemented
in the form of a software product. The software product is
stored in a storage medium and includes a plurality of
instructions for instructing a device (which may be a single-
chip microcomputer, a chip, or the like) or a processor
(processor) to perform all or some of the steps of the
methods described in embodiments of this application. The
foregoing storage medium includes: any medium that can
store program code, such as a USB flash drive, a removable
hard disk, a read only memory (read only memory, ROM),
a random access memory (random access memory, RAM),
a magnetic disk, a compact disc, or the like.

The foregoing content is merely specific implementations
of this application, but is not intended to limit the protection
scope of this application. Any variation or replacement
within the technical scope disclosed in this application shall
fall within the protection scope of this application. There-
fore, the protection scope of this application shall be used as
the protection scope of the claims.

The invention claimed is:

1. A touch scanning method, applied to an electronic
device, wherein the electronic device comprises a touch
screen, and the method comprises:

displaying a first interface, and performing touch opera-
tion scanning on the touch screen in a first scanning
manner;

performing, when switching to a second interface, touch
operation scanning on the touch screen in a second
scanning manner associated with a first area, wherein a
key hot zone in the second interface is located in the
first area, and the first area is a position of the key hot
zone in the second interface corresponding to the touch
screen, and wherein the first scanning manner and the
second scanning manner have different scanning direc-
tions; and when the second interface is switched from portrait dis-
play to landscape display, or when the second interface
is switched from the landscape display to the portrait
display, or when the second interface is switched from
display in a first landscape direction to display in a
second landscape direction, switching, by the elec-
tronic device, to a third scanning manner to perform
touch operation scanning based on a second area in
which the key hot zone in the second interface is
located after the switching the display of the second
interface; and wherein an angle between the first landscape direction and
the second landscape direction is 180°.

2. The method according to claim 1, wherein the first area
is closest to a first boundary position of the touch screen, and
the performing touch operation scanning on the touch screen
in a second scanning manner associated with a first area
comprises:

performing a touch scanning operation in a direction of a
drive electrode at the first boundary position starting
from a drive electrode at a second boundary position of
the touch screen, wherein the first boundary position
and the second boundary position are located on oppo-
site sides of the touch screen.

3. The method according to claim 1, wherein the method
further comprises:

obtaining a frequency of a touch event detected in each
area on the touch screen in a preset time period,
wherein the second interface is displayed on the touch
screen in the preset time period; and using an area in which the frequency meets a preset
condition as the key hot zone in the second interface.

4. The method according to claim 1, wherein the method
further comprises:

obtaining a touch type corresponding to a touch object in
the key hot zone in the second interface, wherein the
touch type is for determining a response speed priority
of the touch object; and using an area of the touch object on the touch screen as the
key hot zone in the second interface if it is determined
that the response speed priority is a target priority based
on the touch type.

5. The method according to claim 1, wherein the method
further comprises:

starting a target application, wherein the second interface
is an interface of the target application;

obtaining an application identifier of the target applica-
tion;

obtaining an initial area of the key hot zone in the second
interface corresponding to the target application on the
touch screen based on the application identifier; and using the initial area as the first area if it is determined that
a screen display direction does not change.

6. The method according to claim 5, wherein the obtaining
an initial area of the key hot zone in the second interface
corresponding to the target application on the touch screen
based on the application identifier comprises:

enabling a function of dynamically adjusting a scanning sequence if it is determined that the target application is a preset application; and obtaining the initial area of the key hot zone in the second interface corresponding to the target application on the touch screen based on the application identifier of the target application.

7. The method according to claim 1, wherein the method further comprises:

obtaining a rotation direction and a rotation angle of the electronic device; and switching, by the electronic device if the rotation angle is greater than or equal to a deflection threshold, to the third scanning manner to perform touch operation scanning based on the second area in which the key hot zone of the second interface is located.

8. The method according to claim 1, wherein the method further comprises: switching, by the electronic device if a gesture operation performed in the second interface is detected, to the third scanning manner to perform touch operation scanning based on the second area in which the key hot zone in the second interface is located after the switching the display of the second interface, wherein the gesture operation is for adjusting a display direction of the second interface when the touch screen is not rotated.

9. The method according to claim 1, wherein the method further comprises:

performing touch operation scanning in a preset scanning direction when the first interface does not comprise the key hot zone.

10. The method according to claim 1, wherein after the performing touch operation scanning on the touch screen in a second scanning manner associated with a first area, the method further comprises:

displaying a third interface, and scanning, when the third interface does not comprise the key hot zone, a touch operation on the touch screen in the second scanning manner or a preset scanning direction.

11. The method according to claim 1, wherein the first scanning manner or the second scanning manner is in a periodic cycle, and the method further comprises:

obtaining scanning data after each periodicity of scanning is completed;

detecting, from the scanning data, a touch signal generated when the touch screen receives the touch operation;

obtaining a generation position of the touch signal, to obtain touch coordinates corresponding to the touch operation;

determining a touch object corresponding to the touch operation based on the touch coordinates; and responding to the touch operation based on the touch object.

12. A touch screen, configured to:

display a first interface, and perform touch operation scanning on the touch screen in a first scanning manner;

perform, when switching to a second interface, touch operation scanning on the touch screen in a second scanning manner associated with a first area, wherein a key hot zone in the second interface is located in the first area, and the first area is a position of the key hot zone in the second interface corresponding to the touch screen, and the first scanning manner and the second scanning manner have different scanning directions; and when the second interface is switched from portrait display to landscape display, or when the second interface is switched from the landscape display to the portrait display, or when the second interface is switched from display in a first landscape direction to display in a second landscape direction, switch to a third scanning manner to perform touch operation scanning based on a second area in which the key hot zone in the second interface is located after the switching the display of the second interface; and wherein an angle between the first landscape direction and the second landscape direction is 180°.

13. The touch screen according to claim 12, wherein the first area is closest to a first boundary position of the touch screen, and the performing touch operation scanning on the touch screen in a second scanning manner associated with a first area comprises:

performing a touch scanning operation in a direction of a drive electrode at the first boundary position starting from a drive electrode at a second boundary position of the touch screen, wherein the first boundary position and the second boundary position are located on opposite sides of the touch screen.

14. The touch screen according to claim 12, wherein the touch screen is further configured to:

perform touch operation scanning in a preset scanning direction when the first interface does not comprise the key hot zone.

15. The touch screen according to claim 12, wherein the touch screen is comprised in a mobile electronic device.

16. An electronic device, comprising a touch screen, a memory, and one or more processors, wherein the touch screen, the memory, and the processor are coupled; the memory stores computer program code, and the computer program code comprises computer instructions; and when the one or more processors execute the computer instructions, the electronic device is enabled to:

display a first interface, and perform touch operation scanning on the touch screen in a first scanning manner;

perform, when switching to a second interface, touch operation scanning on the touch screen in a second scanning manner associated with a first area, wherein a key hot zone in the second interface is located in the first area, and the first area is a position of the key hot zone in the second interface corresponding to the touch screen, and the first scanning manner and the second scanning manner have different scanning directions; and when the second interface is switched from portrait display to landscape display, or when the second interface is switched from the landscape display to the portrait display, or when the second interface is switched from display in a first landscape direction to display in a second landscape direction, switch to a third scanning manner to perform touch operation scanning based on a second area in which the key hot zone in the second interface is located after the switching the display of the second interface; and wherein an angle between the first landscape direction and the second landscape direction is 180°.

17. The electronic device according to claim 16, wherein the first area is closest to a first boundary position of the touch screen, and the performing touch operation scanning on the touch screen in a second scanning manner associated with a first area comprises:

performing a touch scanning operation in a direction of a drive electrode at the first boundary position starting from a drive electrode at a second boundary position of the touch screen, wherein the first boundary position and the second boundary position are located on opposite sides of the touch screen.

18. The electronic device according to claim 16, wherein the electronic device is further enabled to:

obtain a frequency of a touch event detected in each area on the touch screen in a preset time period, wherein the second interface is displayed on the touch screen in the preset time period; and use an area in which the frequency meets a preset condition as the key hot zone.

19. The electronic device according to claim 16, wherein the electronic device is further enabled to:

obtain a touch type corresponding to a touch object in the key hot zone, wherein the touch type is for determining a response speed priority of the touch object; and use an area of the touch object on the touch screen as the key hot zone if it is determined that the response speed priority is a target priority based on the touch type.

20. The electronic device according to claim 16, wherein the electronic device is further enabled to:

perform touch operation scanning in a preset scanning direction when the first interface does not comprise the key hot zone.

\* \* \* \* \*